United States Patent
Hirabayashi

(10) Patent No.: US 9,378,427 B2
(45) Date of Patent: Jun. 28, 2016

(54) DISPLAYING HANDWRITTEN STROKES ON A DEVICE ACCORDING TO A DETERMINED STROKE DIRECTION MATCHING THE PRESENT DIRECTION OF INCLINATION OF THE DEVICE

(71) Applicant: KABUSHIKI KAISHA TOSHIBA, Minato-ku, Tokyo (JP)

(72) Inventor: Hirotada Hirabayashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 404 days.

(21) Appl. No.: 14/066,575

(22) Filed: Oct. 29, 2013

(65) Prior Publication Data

US 2014/0325351 A1  Oct. 30, 2014

(30) Foreign Application Priority Data

Apr. 24, 2013 (JP) ................................. 2013-091500

(51) Int. Cl.
| | |
|---|---|
| *G06F 17/00* | (2006.01) |
| *G06K 9/22* | (2006.01) |
| *G06K 9/32* | (2006.01) |
| *G06F 3/0488* | (2013.01) |
| *G06K 9/00* | (2006.01) |

(52) U.S. Cl.
CPC ............ *G06K 9/222* (2013.01); *G06F 3/04883* (2013.01); *G06K 9/00865* (2013.01); *G06K 9/3208* (2013.01)

(58) Field of Classification Search
CPC .................................................. G06K 9/3208
USPC ........... 715/202, 233, 798, 800, 863; 382/291
See application file for complete search history.

(56) References Cited

U.S. PATENT DOCUMENTS

| | | | | | |
|---|---|---|---|---|---|
| 7,004,394 | B2* | 2/2006 | Kim | ...................... | G06F 1/1616 235/439 |
| 7,128,265 | B2* | 10/2006 | Silverbrook | ............ | G06F 3/014 235/435 |
| 7,848,093 | B2* | 12/2010 | Hardson | .............. | A44B 11/001 224/163 |
| 8,023,741 | B2* | 9/2011 | Ferman | .................. | G06K 9/325 382/140 |
| 8,023,770 | B2* | 9/2011 | Ferman | ................ | G06K 9/3208 382/289 |
| 8,144,989 | B2* | 3/2012 | Speigle | ................ | G06K 9/3208 382/168 |
| 8,160,365 | B2* | 4/2012 | Campbell | ............ | G06K 9/3208 382/190 |

(Continued)

FOREIGN PATENT DOCUMENTS

| | | |
|---|---|---|
| JP | 11-066238 A | 3/1999 |
| JP | 2011-028697 A | 2/2011 |

OTHER PUBLICATIONS

Kruger et al, How People Use Orientation on Tables: Comprehension, Coordination and Communication, University of Calgary Department of Computer Science, Nov. 12, 2003, 10 pages.*

*Primary Examiner* — Mohammed-Ibrahim Zuberi
(74) *Attorney, Agent, or Firm* — Knobbe, Martens, Olson & Bear LLP

(57) ABSTRACT

According to one embodiment, an electronic device includes a display processor, a determiner and a storage processor. The display processor displays on a screen a plurality of strokes input by handwriting. The determiner determines a top-and-bottom direction for each of the plurality of strokes. The storage processor is configured to store in a storage medium handwritten data. The handwritten data includes a plurality of stroke data corresponding to the plurality of strokes, and a plurality of pieces of direction information relating to a top-and-bottom direction each of the plurality of strokes.

18 Claims, 20 Drawing Sheets

(56) References Cited

U.S. PATENT DOCUMENTS

| | | | | |
|---|---|---|---|---|
| 8,208,725 B2 * | 6/2012 | Ferman | ................ | G06K 9/3208 382/168 |
| 8,340,430 B2 * | 12/2012 | Campbell | ............ | G06K 9/3208 382/190 |
| 8,723,820 B1 * | 5/2014 | Han | ........................ | G06F 3/016 178/18.01 |
| 8,977,042 B2 * | 3/2015 | Huo | ................... | G06K 9/00409 382/161 |
| 9,076,058 B2 * | 7/2015 | Ferman | ................ | G06K 9/3283 |
| 9,213,911 B2 * | 12/2015 | Wexler | ................ | G09B 21/006 |
| 2005/0041865 A1 * | 2/2005 | Zhen | .................... | G06K 9/3283 382/187 |
| 2010/0083111 A1 * | 4/2010 | de los Reyes | ......... | G06F 3/0482 715/702 |
| 2012/0299964 A1 * | 11/2012 | Homma | ................ | G06F 1/1694 345/649 |

\* cited by examiner

| Stroke ID | Stroke direction (top-and-bottom) | Stroke data (point information) |
|---|---|---|
| 0001 | Normal direction/90°/180°/270° | (X11,Y11),(X12,Y12),----- |
| 0002 | Normal direction/90°/180°/270° | (X21,Y21),(X22,Y22),----- |
| ⋮ | ⋮ | ⋮ |

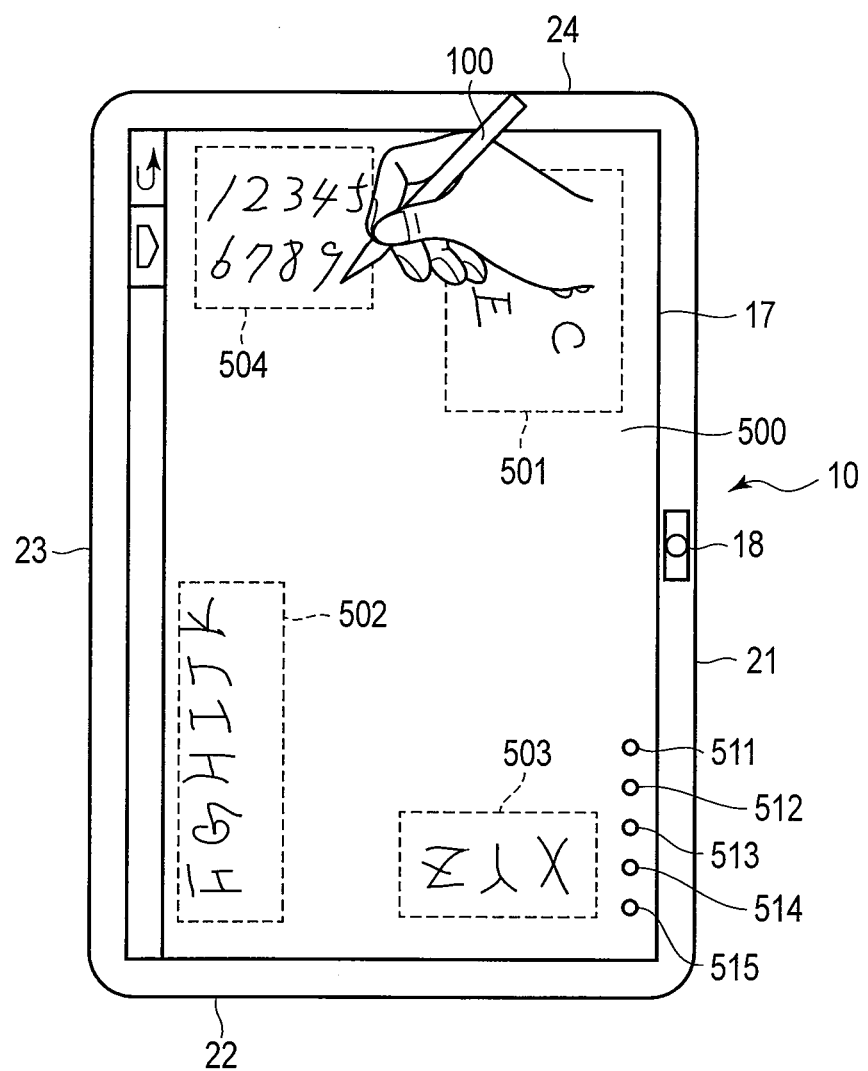
F I G. 10

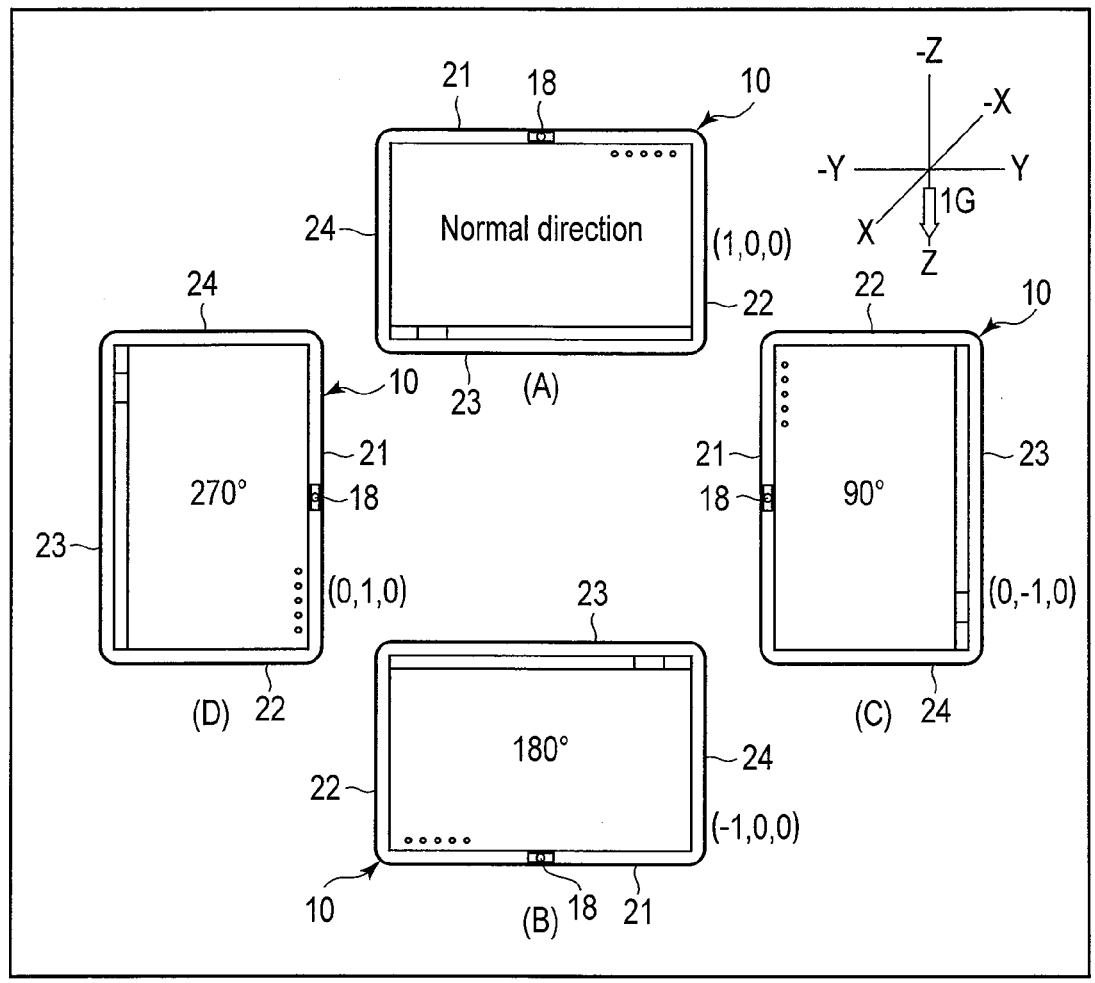
F I G. 14

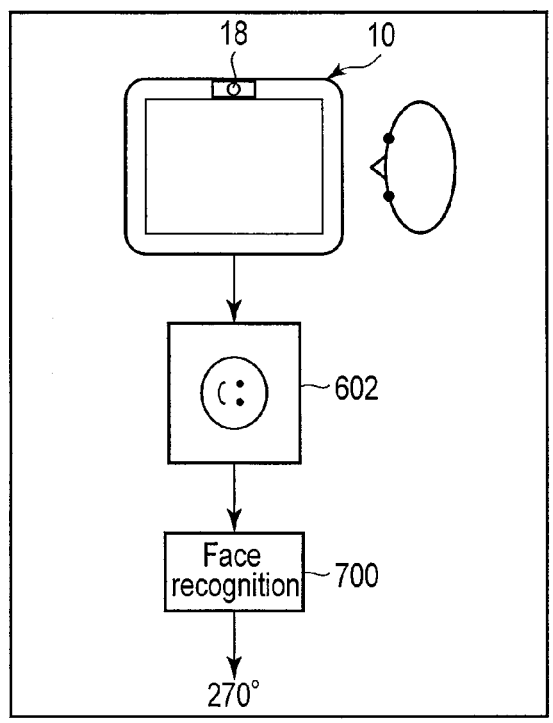
F I G. 17
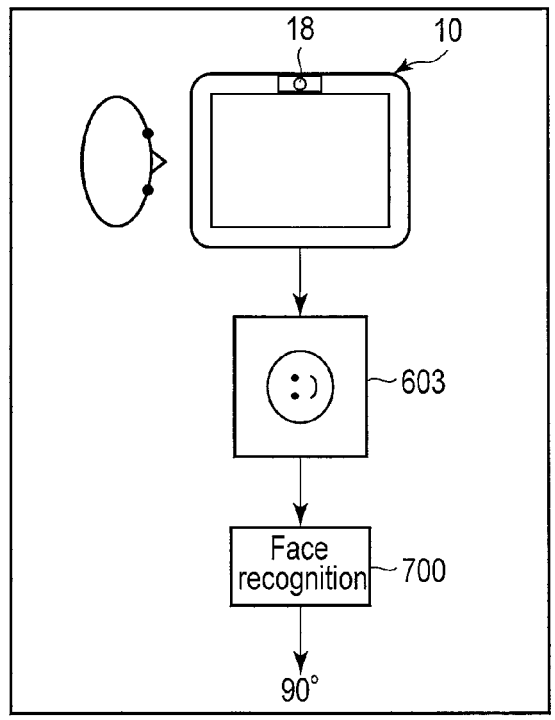
F I G. 18

DISPLAYING HANDWRITTEN STROKES ON A DEVICE ACCORDING TO A DETERMINED STROKE DIRECTION MATCHING THE PRESENT DIRECTION OF INCLINATION OF THE DEVICE

CROSS-REFERENCE TO RELATED APPLICATIONS

This application is based upon and claims the benefit of priority from Japanese Patent Application No. 2013-091500, filed Apr. 24, 2013, the entire contents of which are incorporated herein by reference.

FIELD

Embodiments described herein relate generally to a technique of processing handwritten data.

BACKGROUND

In recent years, various kinds of electronic devices, such as a tablet terminal, a PDA and a smartphone, have been developed. Most of these electronic devices include touch-screen displays for facilitating input operations by users.

By touching a menu or an object, which is displayed on the touch-screen display, by a finger or the like, the user can instruct an electronic device to execute a function which is associated with the menu or object.

However, most of existing electronic devices with touch-screen displays are consumer products which are designed to enhance operability on various media data such as video and music, and are not necessarily suitable for use in a business situation such as a meeting, a business negotiation or product development. Thus, in business situations, paper-based pocket notebooks have still been widely used.

Recently, a technique for determining a relationship between a tablet terminal and the seating position of a user, based on the direction of writing of handwritten characters, has also been developed.

In the meantime, in general, most of tablet terminals have a function of automatically rotating the direction of a screen image in accordance with the direction of the tablet terminal.

However, in a handwriting application which handles a handwritten document, if the direction of the screen image of the application is automatically rotated in accordance with the direction of the tablet terminal, there may be a case in which a feeling of use, such as a feeling of using a real paper-based pocket notebook, cannot be obtained. The reason for this is that if the direction of the screen image is automatically rotated, it would become difficult to handwrite characters, etc. in a free direction on the display screen of the handwriting application.

On the other hand, the handwriting application is required to also have a function as a digital tool for handling a handwritten document as digital data.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 10 is an exemplary view for describing an operation of displaying strokes which are handwritten in a state in which the electronic device of the embodiment is inclined such that the direction of the note view screen is inclined by 90° to the right, relative to the direction of gravity.

FIG. 14 is an exemplary view for explaining a relationship between the inclination direction of the electronic device of the embodiment and a detection output of the acceleration sensor.

FIG. 17 is a view illustrating still another example of the operation of determining stroke direction information with use of a face recognition result.

FIG. 18 is a view illustrating still another example of the operation of determining stroke direction information with use of a face recognition result.

DETAILED DESCRIPTION

Various embodiments will be described hereinafter with reference to the accompanying drawings.

In general, according to one embodiment, an electronic device includes a display processor, a determiner and a storage processor. The display processor is configured to display on a screen a plurality of strokes input by handwriting. The determiner is configured to determine a top-and-bottom direction for each of the plurality of strokes. The storage processor is configured to store in a storage medium handwritten data. The handwritten data includes a plurality of stroke data corresponding to the plurality of strokes, and a plurality of pieces of direction information relating to a top-and-bottom direction of each of the plurality of strokes. The determiner is configured to determine a top-and-bottom direction of each of the plurality of strokes, by using at least either a direction of inclination of the electronic device which is determined in accordance with an output of an acceleration sensor in the electronic device, or a positional relationship between the electronic device and a user, which is determined in accordance with a result of face recognition using an image captured by a camera module of the electronic device.

Figure 1:
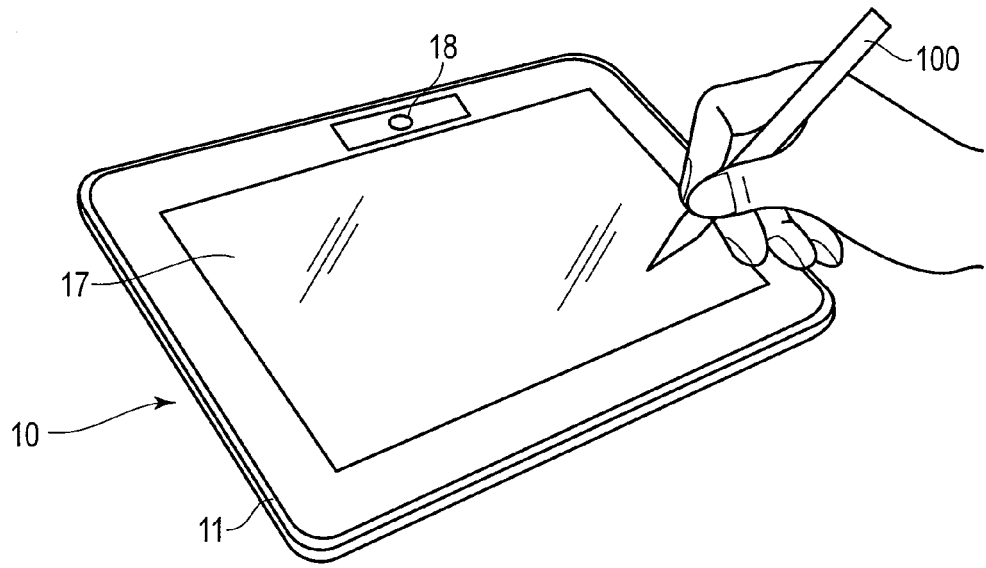
FIG. 1 is an exemplary perspective view illustrating an external appearance of an electronic device according to an embodiment.

FIG. 1 is a perspective view illustrating an external appearance of an electronic device according to an embodiment. The electronic device is, for instance, a pen-based portable electronic device which can execute a handwriting input by a pen or a finger. This electronic device may be realized as a tablet computer, a notebook-type personal computer, a smartphone, a PDA, etc. In the description below, the case is assumed that this electronic device is realized as a tablet computer 10. The tablet computer 10 is a portable electronic device which is also called "tablet" or "slate computer". As shown in FIG. 1, the tablet computer 10 includes a main body 11 and a touch-screen display 17. The main body 11 has a thin box-shaped housing. The touch-screen display 17 is attached such that the touch-screen display 17 is laid over the top surface of the main body 11. In addition, a camera module (Web camera) 18 is disposed on the top surface of the main body 11. The camera module 18 is provided, for example, at an upper end portion of the main body 11, which is located on the upper side of the touch-screen display 17. The camera module 18 can capture an image (a moving picture or a still image) in the vicinity of the front side of the tablet computer 10. Using the camera 18, a user can capture an image (a moving picture or a still image) or can take a photo.

In the touch-screen display 17, a flat-panel display and a sensor, which is configured to detect a touch position of a pen or a finger on the screen of the flat-panel display, are assembled. The flat-panel display may be, for instance, a liquid crystal display (LCD). As the sensor, for example, use may be made of an electrostatic capacitance-type touch panel, or an electromagnetic induction-type digitizer. In the description below, the case is assumed that two kinds of sensors, namely a digitizer and a touch panel, are both assembled in the touch-screen display 17.

The digitizer is disposed, for example, under the screen of the flat-panel display. The touch panel is disposed, for example, over the screen of the flat-panel display. The touch-screen display 17 can detect not only a touch operation on the screen with use of a finger, but also a touch operation on the screen with use of a pen 100. The pen 100 may be, for instance, an electromagnetic-induction pen. The user can execute a handwriting input operation on the touch-screen display 17 by using an external object (pen 100 or finger). During the handwriting input operation, a locus of movement of the external object (pen 100 or finger) on the screen, that is, a locus (trace of writing) of a stroke which is handwritten by a handwriting input operation, is drawn in real time, and thereby the loci of respective strokes are displayed on the screen. A locus of movement of the external object during a time in which the external object is in contact with the screen corresponds to one stroke. A set of many strokes corresponding to handwritten characters or handwritten graphics, that is, a set of many loci (traces of writing), constitutes a handwritten document.

In the present embodiment, this handwritten document is stored in a storage medium not as image data but as time-series information indicative of coordinate series of the loci of strokes and the order relation between the strokes. The details of this time-series information will be described later with reference to FIG. 4. This time-series information indicates an order in which a plurality of strokes are handwritten, and includes a plurality of stroke data corresponding to a plurality of strokes. In other words, the time-series information means a set of time-series stroke data corresponding to a plurality of strokes. Each stroke data corresponds to one stroke, and includes coordinate data series (time-series coordinates) corresponding to points on the locus of this stroke. The order of arrangement of these stroke data corresponds to an order in which strokes are handwritten, that is, an order of strokes.

The tablet computer 10 can read out arbitrary existing time-series information (handwritten data) from the storage medium, and can display on the screen a handwritten document corresponding to this time-series information, that is, a plurality of strokes indicated by this time-series information. Furthermore, the tablet computer 10 has an edit function. The edit function can delete or move an arbitrary stroke or an arbitrary handwritten character or the like in the displayed handwritten document, in accordance with an edit operation by the user with use of an "eraser" tool, a range designation tool, and other various tools. Besides, this edit function includes an operation of clearing the history of some handwriting operations.

In this embodiment, the time-series information (handwritten document) may be managed as one page or plural pages. In this case, the time-series information (handwritten document) may be divided in units of an area which falls within one screen, and thereby a piece of time-series information, which falls within one screen, may be stored as one page. Alternatively, the size of one page may be made variable. In this case, since the size of a page can be increased to an area which is larger than the size of one screen, a handwritten document of an area larger than the size of the screen can be handled as one page. When one whole page cannot be displayed on the display at a time, this page may be reduced in size and displayed, or a display target part in the page may be moved by vertical and horizontal scroll.

Figure 2:
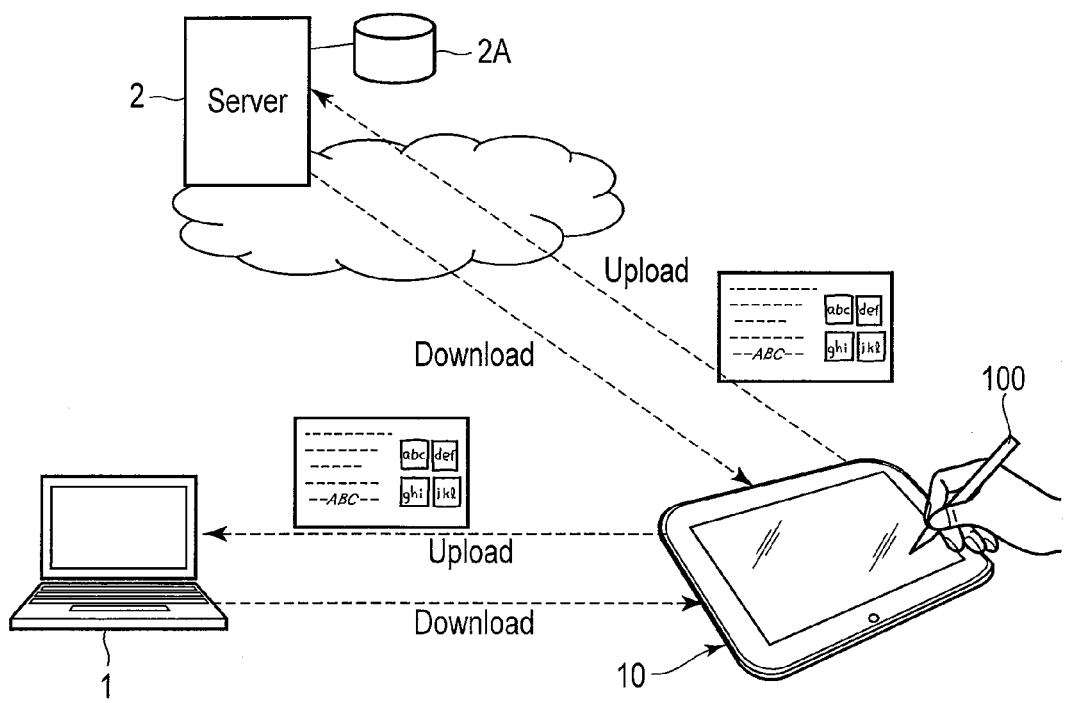
FIG. 2 is an exemplary view illustrating a cooperative operation between the electronic device of the embodiment and an external apparatus.

FIG. 2 shows an example of a cooperative operation between the tablet computer 10 and an external apparatus. The tablet computer 10 can cooperate with a personal computer 1 or a cloud. Specifically, the tablet computer 10 includes a wireless communication device of, e.g. wireless LAN, and can wirelessly communicate with the personal computer 1. Further, the tablet computer 10 can communicate with a server 2 on the Internet. The server 2 may be a server which executes an online storage service, and other various cloud computing services.

The personal computer 1 includes a storage device such as a hard disk drive (HDD). The tablet computer 10 can transmit time-series information (handwritten data) to the personal computer 1 over a network, and can store the time-series information (handwritten data) in the HDD of the personal computer 1 ("upload"). In order to ensure a secure communication between the tablet computer 10 and personal computer 1, the personal computer 1 may authenticate the tablet computer 10 at a time of starting the communication. In this case, a dialog for prompting the user to input an ID or a password may be displayed on the screen of the tablet computer 10, or the ID of the tablet computer 10, for example, may be automatically transmitted from the tablet computer 10 to the personal computer 1.

Thereby, even when the capacity of the storage in the tablet computer 10 is small, the tablet computer 10 can handle many pieces of time-series information (handwritten data) or large-volume time-series information (handwritten data).

In addition, the tablet computer 10 can read out ("download") one or more arbitrary time-series information stored in the HDD of the personal computer 1, and can display the locus of each stroke indicated by the read-out time-series information on the screen of the display 17 of the tablet computer 10. In this case, the tablet computer 10 may display on the screen of the display 17 a list of thumbnails which are obtained by reducing in size the pages of plural pieces of time-series information (handwritten data), or may display one page, which is selected from these thumbnails, on the screen of the display 17 in the normal size.

Furthermore, the destination of communication of the tablet computer 10 may be not the personal computer 1, but the server 2 on the cloud which provides storage services, etc., as described above. The tablet computer 10 can transmit time-series information (handwritten data) to the server 2 over the network, and can store the time-series information (handwritten data) in a storage device 2A of the server 2 ("upload"). Besides, the tablet computer 10 can read out arbitrary time-series information which is stored in the storage device 2A of the server 2 ("download") and can display the locus of each stroke indicated by the time-series information on the screen of the display 17 of the tablet computer 10.

As has been described above, in the present embodiment, the storage medium in which the time-series information is stored may be the storage device in the tablet computer 10, the storage device in the personal computer 1, or the storage device in the server 2.

Figure 3:
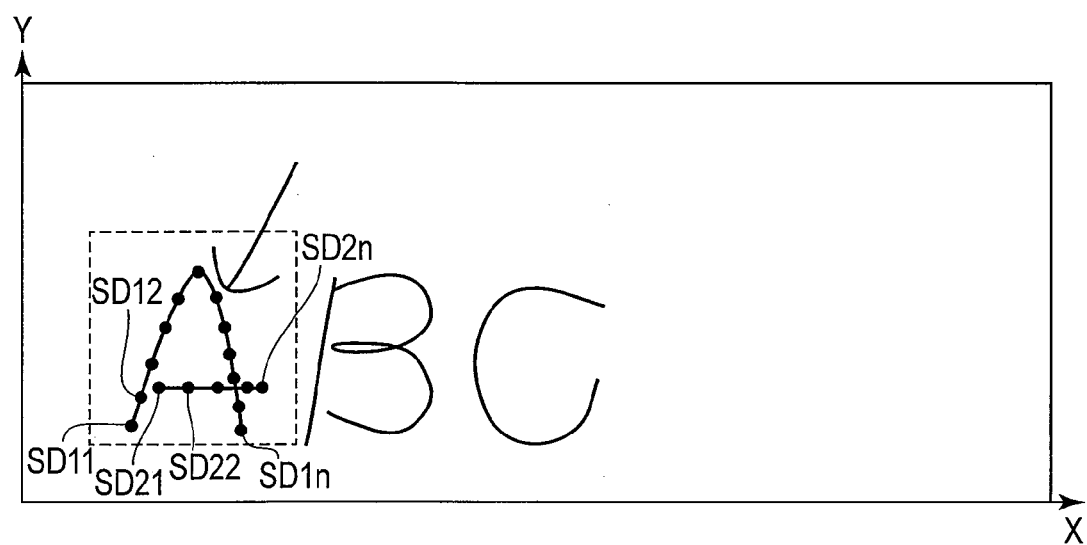
FIG. 3 is a view illustrating an example of a handwritten document which is handwritten on a touch-screen display of the electronic device of the embodiment.
Figure 4:
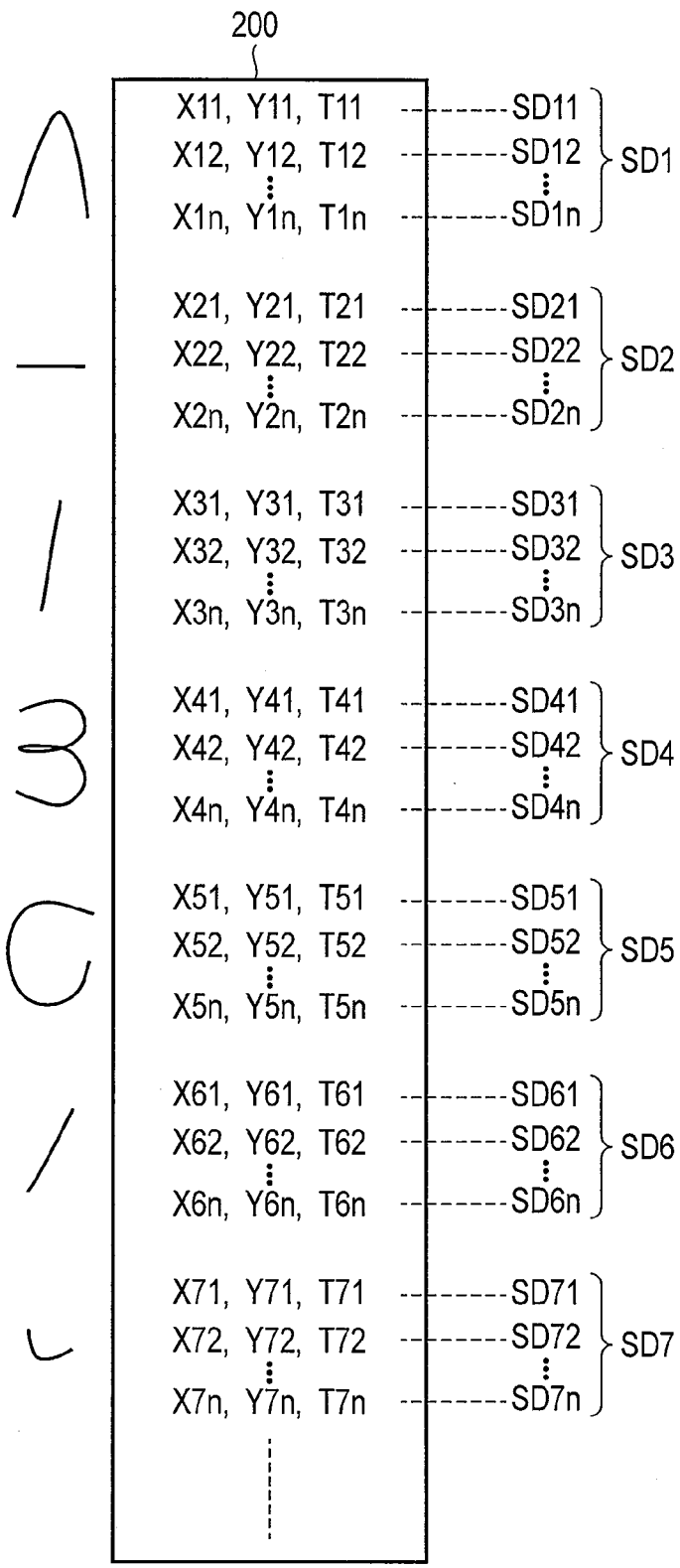
FIG. 4 is an exemplary view for explaining time-series information corresponding to the handwritten document of FIG. 3, the time-series information being generated by the electronic device of the embodiment.

Next, referring to FIG. 3 and FIG. 4, a description is given of a relationship between strokes (characters, marks, graphics, tables, etc.), which are handwritten by the user, and time-series information. FIG. 3 shows an example of a handwritten document (handwritten character string) which is handwritten on the touch-screen display 17 by using the pen 100 or the like.

In many cases, on a handwritten document, other characters or graphics are handwritten over already handwritten characters or graphics. In FIG. 3, the case is assumed that a handwritten character string "ABC" was handwritten in the order of "A", "B" and "C", and thereafter a handwritten arrow was handwritten near the handwritten character "A".

The handwritten character "A" is expressed by two strokes (a locus of "^" shape, a locus of "-" shape) which are handwritten by using the pen 100 or the like, that is, by two loci. The locus of the pen 100 of the first handwritten "^" shape is sampled in real time, for example, at regular time intervals, and thereby time-series coordinates SD11, SD12, . . . , SD1n of the stroke of the "^" shape are obtained. Similarly, the locus of the pen 100 of the next handwritten "-" shape is sampled in real time, for example, at regular time intervals, and thereby time-series coordinates SD21, SD22, . . . , SD2n of the stroke of the "-" shape are obtained.

The handwritten character "B" is expressed by two strokes which are handwritten by using the pen 100 or the like, that is, by two loci. The handwritten character "C" is expressed by one stroke which is handwritten by using the pen 100 or the like, that is, by one locus. The handwritten "arrow" is expressed by two strokes which are handwritten by using the pen 100 or the like, that is, by two loci.

FIG. 4 illustrates time-series information 200 corresponding to the handwritten document of FIG. 3. The time-series information 200 includes a plurality of stroke data SD1, SD2, . . . , SD7. In the time-series information 200, the stroke data SD1, SD2, . . . , SD7 are arranged in time series in the order of strokes, that is, in the order in which plural strokes are handwritten.

In the time-series information 200, the first two stroke data SD1 and SD2 are indicative of two strokes of the handwritten character "A". The third and fourth stroke data SD3 and SD4 are indicative of two strokes which constitute the handwritten character "B". The fifth stroke data SD5 is indicative of one stroke which constitutes the handwritten character "C". The sixth and seventh stroke data SD6 and SD7 are indicative of two strokes which constitute the handwritten "arrow".

Each stroke data includes coordinate data series (time-series coordinates) corresponding to one stroke, that is, a plurality of coordinates corresponding to a plurality of points on the locus of one stroke. In each stroke data, the plural coordinates are arranged in time series in the order in which the stroke is written. For example, as regards handwritten character "A", the stroke data SD1 includes coordinate data series (time-series coordinates) corresponding to the points on the locus of the stroke of the "^" shape of the handwritten character "A", that is, an n-number of coordinate data SD11, SD12, ..., SD1n. The stroke data SD2 includes coordinate data series corresponding to the points on the locus of the stroke of the "-" shape of the handwritten character "A", that is, an n-number of coordinate data SD21, SD22, ..., SD2n. Incidentally, the number of coordinate data may differ between respective stroke data.

Each coordinate data is indicative of an X coordinate and a Y coordinate, which correspond to one point in the associated locus. For example, the coordinate data SD11 is indicative of an X coordinate (X11) and a Y coordinate (Y11) of the starting point of the stroke of the "^" shape. The coordinate data SD1n is indicative of an X coordinate (X1n) and a Y coordinate (Y1n) of the end point of the stroke of the "^" shape.

Further, each coordinate data may include time stamp information T corresponding to a time point at which a point corresponding to this coordinate data was handwritten. The time point at which the point was handwritten may be either an absolute time (e.g. year/month/date/hour/minute/second) or a relative time with reference to a certain time point. For example, an absolute time (e.g. year/month/date/hour/minute/second) at which a stroke began to be handwritten may be added as time stamp information to each stroke data, and furthermore a relative time indicative of a difference from the absolute time may be added as time stamp information T to each coordinate data in the stroke data.

In this manner, by using the time-series information in which the time stamp information T is added to each coordinate data, the temporal relationship between strokes can be more precisely expressed.

Moreover, information (Z) indicative of a pen stroke pressure may be added to each coordinate data.

The time-series information (handwritten document information) 200 having the structure as described with reference to FIG. 4 can express not only the trace of handwriting of each stroke, but also the temporal relation between strokes. Thus, with the use of the time-series information 200, even if a distal end portion of the handwritten "arrow" is written over the handwritten character "A" or near the handwritten character "A", as shown in FIG. 3, the handwritten character "A" and the distal end portion of the handwritten "arrow" can be treated as different characters or graphics.

Furthermore, in the present embodiment, as described above, handwritten document information is stored not as an image or a result of character recognition, but as a set of time-series stroke data. Thus, handwritten characters can be handled, without depending on languages of the handwritten characters. Therefore, the structure of the time-series information 200 of the present embodiment can be commonly used in various countries of the world where different languages are used.

Figure 5:
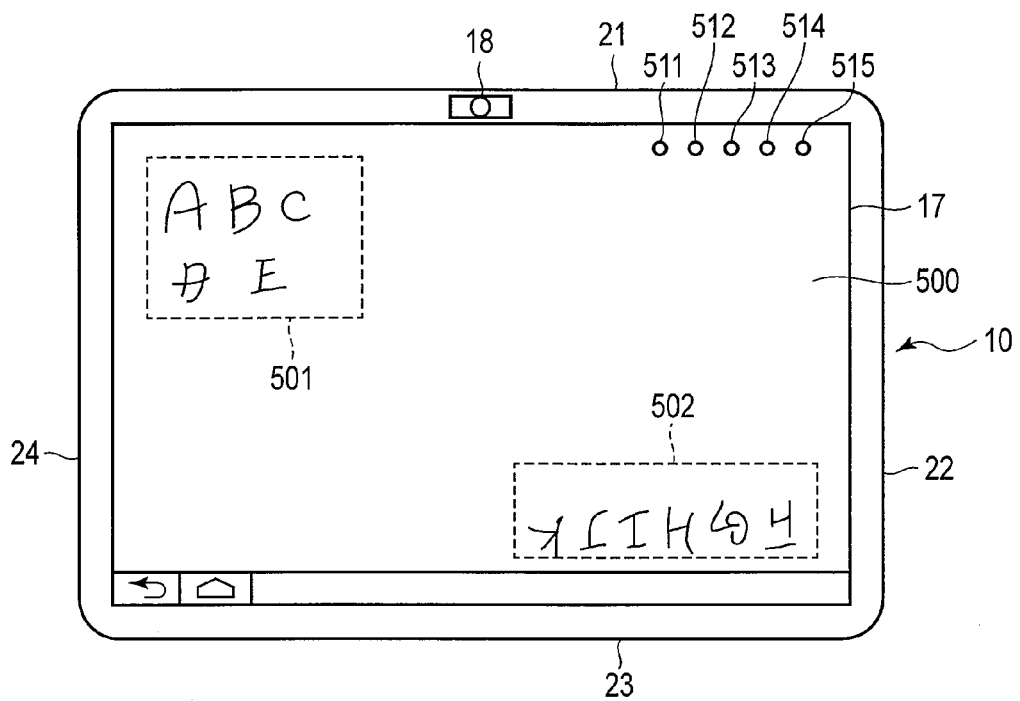
FIG. 5 is an exemplary view for describing a note view screen which is displayed by the electronic device of the embodiment.

FIG. 5 illustrates an example of a note view screen 500 which is displayed on the touch-screen display 17 by a digital notebook application program of the tablet computer 10. The note view screen 500 is a screen which enables new creation of handwritten data (handwritten page) and enables viewing and editing of an existing handwritten page.

The direction of the note view screen 500 is preset. The note view screen 500 is displayed on the touch-screen display 17 in such a direction that the upper side of the note view screen 500 is located on an upper end 21 side of the tablet computer 10 and the lower side of the note view screen 500 is located on a lower end 23 side of the tablet computer 10. The direction of the note view screen 500 is fixed in the above-described preset direction. Even if the direction of inclination of the tablet computer 10 varies relative to the direction of gravity, the note view screen 500 is not rotated.

The note view screen 500 further displays a black pen button 511, a red pen button 512, a marker button 513, a select button 514, and an eraser button 515. The black pen button 511, red pen button 512 and marker button 513 are user interfaces for prompting the user to select the mode of drawing of strokes. The select button 514 is a button which is used as the above-described range designation tool. The eraser button 515 is a button which is used as the above-described eraser tool.

For example, if a handwriting input operation with use of the pen 100 is executed on the note view screen 500 in the state in which the black pen button 511 is selected by a tap gesture or the like by the user, the digital notebook application program displays a black stroke (locus) on the note view screen 500 in accordance with the movement of the pen 100. The user can handwrite an arbitrary character, mark, graphic or table on the note view screen 500. Since the direction of the note view screen 500 is fixed, as described above, the user can perform handwriting on the note view screen 500 in a desired direction, by changing the direction of inclination of the tablet computer 10 to an arbitrary direction, that is, by setting the direction of the note view screen 500 in an arbitrary direction.

FIG. 5 illustrates an example in which strokes 501 having a top-and-bottom direction agreeing with the top-and-bottom direction of the note view screen 500, and strokes 502 having a top-and-bottom direction, which is opposite to the top-and-bottom direction of the note view screen 500, are displayed.

The strokes 501 are a stroke series corresponding to a handwritten character string "ABCDE". The top-and-bottom direction of each stroke of the strokes 501 agrees with the top-and-bottom direction of the note view screen 500 (the top-and-bottom direction of the tablet computer 10). In other words, an upper end of each stroke of the strokes 501 is located on the upper end 21 side of the tablet computer 10, and a lower end of each stroke is located on the lower end 23 side of the tablet computer 10.

The strokes 502 are a stroke series corresponding to a handwritten character string "FGHIJK". The top-and-bottom direction of each of the strokes 502 is opposite to the top-and-bottom direction of the note view screen 500 (the top-and-bottom direction of the tablet computer 10). In other words, each stroke of the strokes 502 is vertically inverted. An upper end of each stroke of the strokes 502 is located on the lower end 23 side of the tablet computer 10, and a lower end of each stroke is located on the upper end 21 side of the tablet computer 10.

Figure 6:
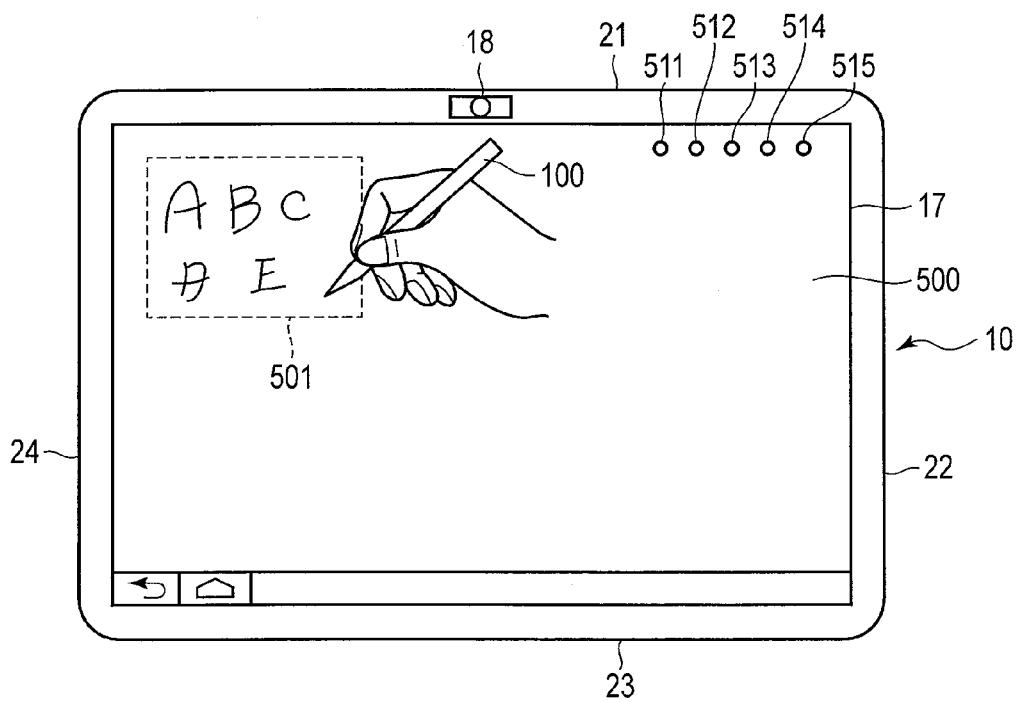
FIG. 6 is an exemplary view for describing an operation of displaying strokes which are handwritten in a state in which the electronic device of the embodiment is inclined such that the direction of the note view screen agrees with the direction of gravity.

The handwritten character string "ABCDE" corresponding to the strokes 501 is a character string which is handwritten on the note view screen 500 in the state in which the tablet computer 10 is inclined such that the top-and-bottom direction of the note view screen 500 agrees with the direction of gravity, for example, as illustrated in FIG. 6. The state, in which the upper end 21 of the tablet computer 10 is located on the upper side of the lower end 23 in the direction of gravity, as illustrated in FIG. 6, corresponds to the inclination direction of the tablet computer 10 in which the top-and-bottom direction of the note view screen 500 agrees with the direction of gravity.

The direction of inclination of the tablet computer 10 may be defined by using various parameters. For example, a first line, which is perpendicular to both left and right sides of the touch-screen display 17 (or the main body 11 of tablet computer 10), and a second line, which is perpendicular to both upper and lower sides of the touch-screen display 17 (or the main body 11 of tablet computer 10), are defined. A direction, in which either the first line or the second line extends downward relative to the direction of gravity, may be set to be the direction of inclination of the tablet computer 10.

Each of strokes, which are handwritten while the table computer 10 is in the state of FIG. 6, can be handled as a stroke having a direction agreeing with the direction of the note view screen 500. In other words, the top-and-bottom direction of each stroke, which is handwritten while the table computer 10 is in the state of FIG. 6, can be estimated to be a direction agreeing with the top-and-bottom direction of the note view screen 500.

Figures 7, 8:
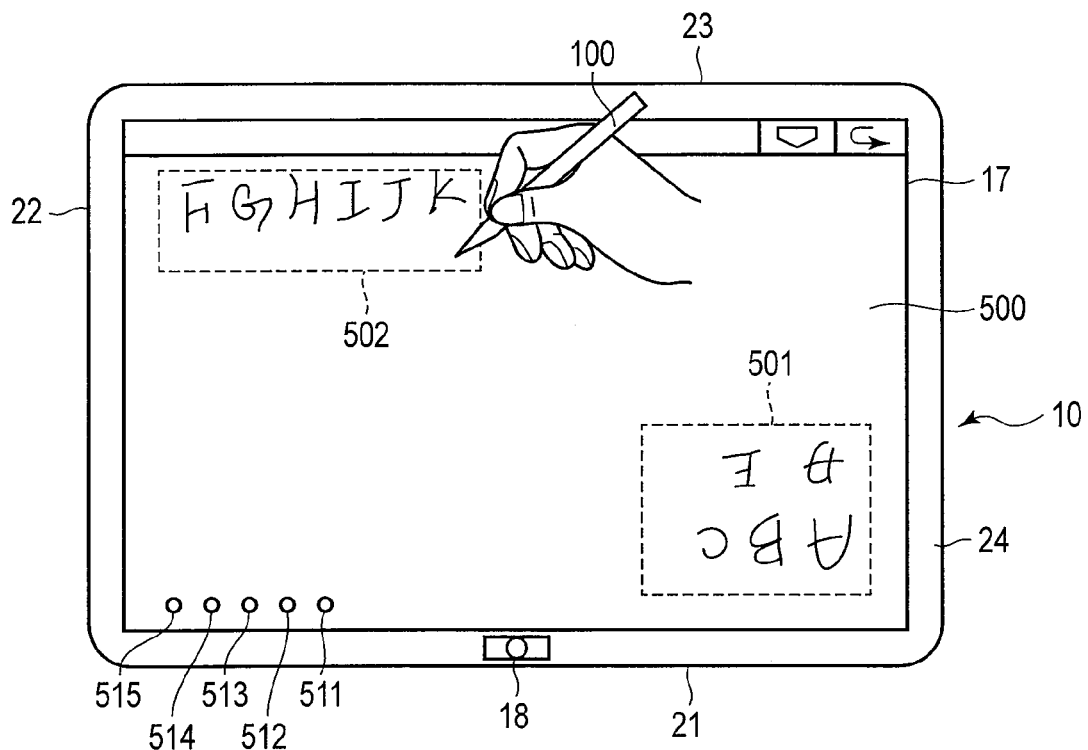
FIG. 7 is an exemplary view for describing an operation of displaying strokes which are handwritten in a state in which the electronic device of the embodiment is inclined such that the direction of the note view screen is opposite to the direction of gravity.
FIG. 8 is an exemplary view for explaining handwritten data including stroke data and stroke direction information stored by the electronic device of the embodiment.

The handwritten character string "FGHIJK" corresponding to the strokes 502 is a character string which is handwritten on the note view screen 500 in the state in which the tablet computer 10 is inclined such that the top-and-bottom direction of the note view screen 500 is opposite to the direction of gravity, for example, as illustrated in FIG. 7. The state, in which the lower end 23 of the tablet computer 10 is located on the upper side of the upper end 21 in the direction of gravity, as illustrated in FIG. 7, corresponds to the inclination direction of the tablet computer 10 in which the top-and-bottom direction of the note view screen 500 opposite to the direction of gravity. Each of strokes, which are handwritten while the table computer 10 is in the state of FIG. 7, can be handled as a stroke having a direction opposite to the direction of the note view screen 500. In other words, the top-and-bottom direction of each stroke, which is handwritten while the table computer 10 is in the state of FIG. 7, can be estimated to be a direction opposite to the top-and-bottom direction of the note view screen 500.

As has been described above, in the present embodiment, since the direction of the note view screen 500 is fixed, the user can perform handwriting on the note view screen 500 in a desired direction, by changing the inclination direction of the tablet computer 10. Accordingly, the user can use the tablet computer 10 with the same feeling as a real paper-based pocket notebook. In this case, however, since the relationship between the top-and-bottom direction of the note view screen 500 (handwritten page) and the top-and-bottom direction of each stroke becomes unclear, there may be a case in which it is difficult to exactly execute various processes on plural stroke data in the handwritten page.

Taking this into account, in the embodiment, stroke direction information indicative of the top-and-bottom direction of each stroke is added to the stroke data corresponding to each stroke. The top-and-bottom direction of a stroke may be determined with reference to the direction of the note view screen 500. In this case, stroke direction information of a certain stroke is indicative of the top-and-bottom direction of this stroke relative to the note view screen 500.

FIG. 8 illustrates an example of the data structure of handwritten data (handwritten page) corresponding to one page.

The handwritten data includes "stroke ID", "stroke direction (top-and-bottom)" and "stroke data" with respect to each stroke. The "stroke ID" is an identifier of each corresponding stroke. The "stroke direction (top-and-bottom)" is direction information which is indicative of the top-and-bottom direction of each stroke relative to the screen (note view screen 500). The "stroke direction (top-and-bottom)" may indicate either a first direction ("normal direction") which agrees with the top-and-bottom direction of the screen, or a second direction ("180°") which is opposite to the first direction.

Alternatively, the "stroke direction (top-and-bottom)" may indicate one of the first direction ("normal direction") which agrees with the top-and-bottom direction of the screen, the second direction ("180°") which is opposite to the first direction, a third direction ("90°") with a clockwise rotation of 90° relative to the top-and-bottom direction of the screen, and a fourth direction ("270°") with a clockwise rotation of 270° relative to the top-and-bottom direction of the screen.

Figure 9:
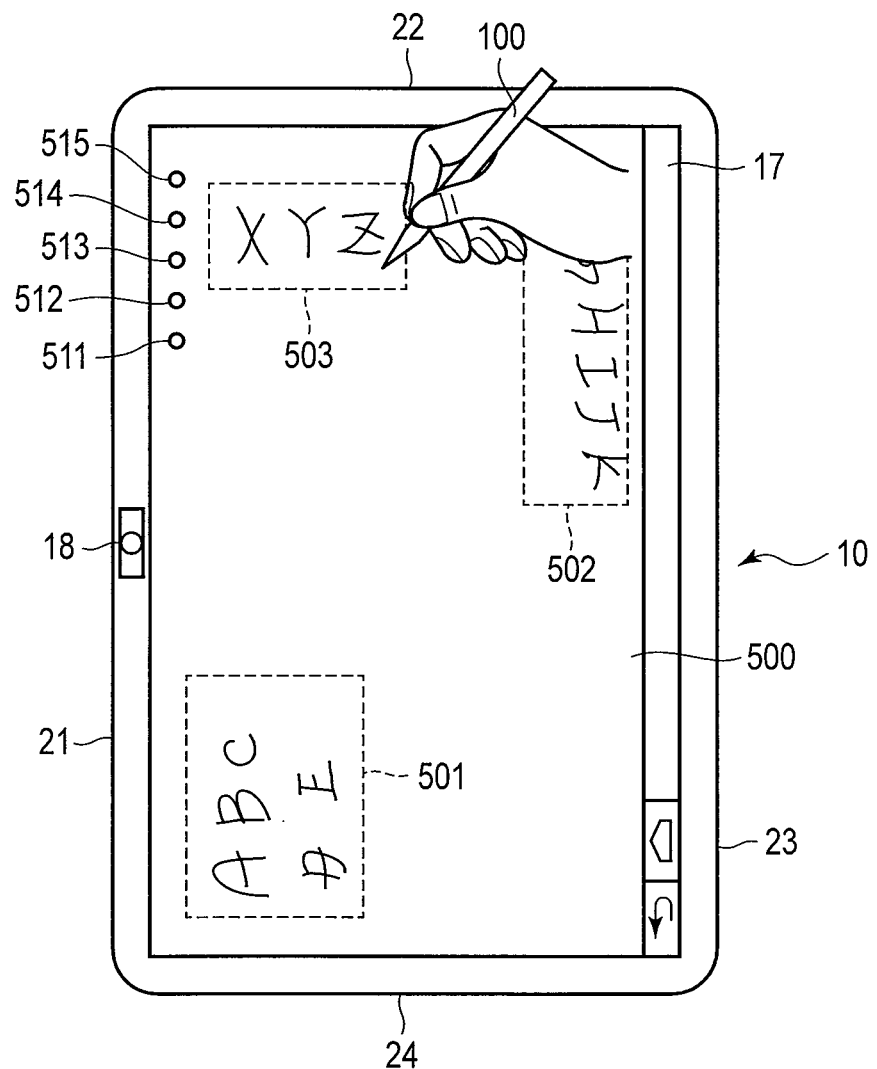
FIG. 9 is an exemplary view for describing an operation of displaying strokes which are handwritten in a state in which the electronic device of the embodiment is inclined such that the direction of the note view screen is inclined by 90° to the left, relative to the direction of gravity.

FIG. 9 illustrates strokes 503 having the third direction ("90°").

A handwritten character string "XYZ" corresponding to the strokes 503 is a character string which was handwritten on the note view screen 500 in the state in which the tablet computer 10 is inclined such that the top-and-bottom direction of the note view screen 500 is rotated by 90° to the left relative to the direction of gravity, for example, as illustrated in FIG. 9. The state, in which a right end 22 of the tablet computer 10 is located on the upper side of a left end 24 in the direction of gravity, as illustrated in FIG. 9, corresponds to the inclination direction of the tablet computer 10 in which the top-and-bottom direction of the note view screen 500 is rotated by 90° to the left relative to the direction of gravity. Each of strokes, which are handwritten while the tablet computer 10 is in the state of FIG. 9, can be handled as a stroke having the third direction ("90°"). In other words, the top-and-bottom direction of each stroke, which is handwritten while the table computer 10 is in the state of FIG. 9, can be estimated to be a direction rotated by 90° relative to the top-and-bottom direction of the note view screen 500.

FIG. 10 illustrates strokes 504 having the fourth direction ("270°").

A handwritten character string "123456789" corresponding to the strokes 504 is a character string which was handwritten on the note view screen 500 in the state in which the tablet computer 10 is inclined such that the top-and-bottom direction of the note view screen 500 is rotated by 90° to the right relative to the direction of gravity, for example, as illustrated in FIG. 10. The state, in which the left end 24 of the tablet computer 10 is located on the upper side of the right end 22 in the direction of gravity, as illustrated in FIG. 10, corresponds to the inclination direction of the tablet computer 10 in which the top-and-bottom direction of the note view screen 500 is rotated by 90° to the right relative to the direction of gravity. Each of strokes, which are handwritten while the tablet computer 10 is in the state of FIG. 10, can be handled as a stroke having the fourth direction ("270°"). In other words, the top-and-bottom direction of each stroke, which is handwritten while the table computer 10 is in the state of FIG. 10, can be estimated to be a direction rotated by 270° relative to the top-and-bottom direction of the note view screen 500.

Figure 11:
FIG. 11 is an exemplary view for explaining stroke direction information corresponding to a stroke series having a direction agreeing with the direction of the note view screen.

FIG. 11 shows an example of a handwritten data portion corresponding to a handwritten character "A" in the strokes 501 of FIG. 5. The handwritten character "A" includes a stroke ST1 and a stroke ST2.

As regards the stroke ST1, the stroke ID=1 is an identifier of the stroke ST1. The stroke direction="normal direction" of the stroke ST1 indicates that the top-and-bottom direction of the stroke ST1 is the above-described "normal direction", that is, the top-and-bottom direction of the stroke ST1 agrees with the direction of the screen. The stroke data of the stroke ST1 is indicative of a plurality of coordinates of a plurality of points on the stroke ST1.

As regards the stroke ST2, the stroke ID=2 is an identifier of the stroke ST2. The stroke direction="normal direction" of the stroke ST2 indicates that the top-and-bottom direction of the stroke ST2 is the above-described "normal direction", that is, the top-and-bottom direction of the stroke ST2 agrees with the direction of the screen. The stroke data of the stroke ST2 is indicative of a plurality of coordinates of a plurality of points on the stroke ST2.

Figure 12:
FIG. 12 is an exemplary view for explaining stroke direction information corresponding to a stroke series having a direction opposite to the direction of the note view screen.

FIG. 12 shows an example of a handwritten data portion corresponding to a handwritten character "F" in the strokes 502 of FIG. 5 (in FIG. 5, "F" is read as an inverted F). The handwritten character "F" includes a stroke ST13, a stroke ST14 and a stroke ST15.

As regards the stroke ST13, the stroke ID=13 is an identifier of the stroke ST13. The stroke direction="180°" of the stroke ST13 indicates that the top-and-bottom direction of the stroke ST13 is the above-described "180°", that is, the top-and-bottom direction of the stroke ST13 is opposite to the direction of the screen. The stroke data of the stroke ST13 is indicative of a plurality of coordinates of a plurality of points on the stroke ST13.

As regards the stroke ST14, the stroke ID=14 is an identifier of the stroke ST14. The stroke direction="180°" of the stroke ST14 indicates that the top-and-bottom direction of the stroke ST14 is the above-described "180°", that is, the top-and-bottom direction of the stroke ST14 is opposite to the direction of the screen. The stroke data of the stroke ST14 is indicative of a plurality of coordinates of a plurality of points on the stroke ST14.

As regards the stroke ST15, the stroke ID=15 is an identifier of the stroke ST15. The stroke direction="180°" of the stroke ST15 indicates that the top-and-bottom direction of the stroke ST15 is the above-described "180°", that is, the top-and-bottom direction of the stroke ST15 is opposite to the direction of the screen. The stroke data of the stroke ST15 is indicative of a plurality of coordinates of a plurality of points on the stroke ST15.

In the embodiment, the top-and-bottom direction of each stroke is determined by using at least either the inclination direction of the tablet computer 10 which is determined in accordance with an output of an acceleration sensor in the tablet computer 10, or the positional relationship between the tablet computer 10 and the user, which is determined in accordance with a result of face recognition using an image captured by the camera module 18.

Figure 13:
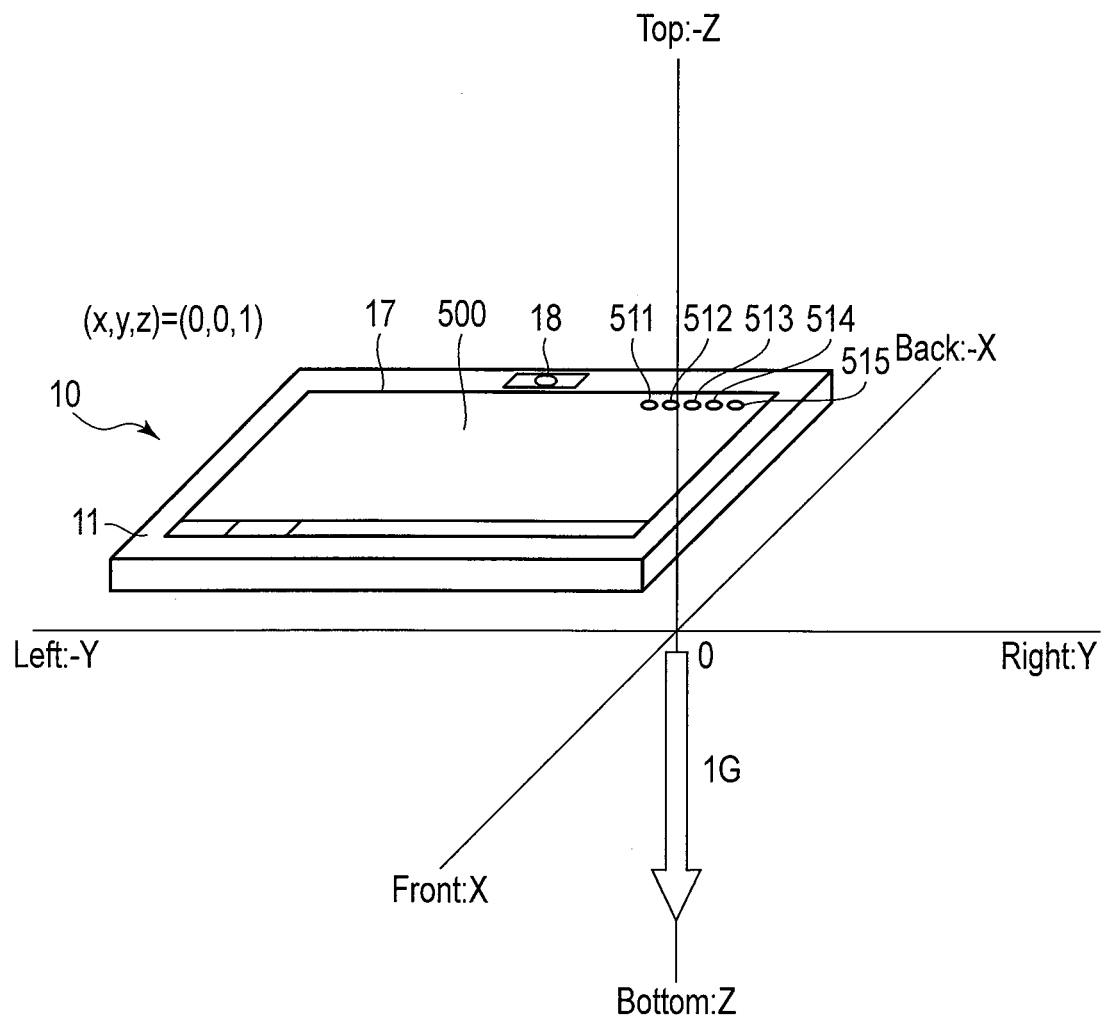
FIG. 13 is an exemplary view for explaining an example of directions of three axes of an acceleration sensor in the electronic device of the embodiment.

FIG. 13 illustrates an example of the directions of three axes of the acceleration sensor.

An X axis is, for example, an axis which is parallel to short sides (a left side and a right side) of the touch-screen display 14. The front side of the X axis is set at +X and the back side of the X axis is set at −X. A Y axis is, for example, an axis which is parallel to long sides (an upper side and a lower side) of the touch-screen display 14. The left side of the Y axis is set at −Y and the right side of the Y axis is set at +Y. A Z axis is, for example, an axis which is perpendicular to the screen of the touch-screen display (the top surface of the tablet computer 10). The top end side of the Z axis is set at −Z and the bottom end side of the Z axis is set at +Z.

In the state in which the tablet computer 10 is placed on a horizontal plane such as on the desk, as illustrated in FIG. 13, the output (x, y, z) of the acceleration sensor is (0, 0, 1).

FIG. 14 illustrates a relationship between the inclination direction of the tablet computer 10 (the direction of the tablet computer 10) and a detection output of the acceleration sensor. In order to simplify the description, it is assumed that the back surface of the tablet computer 10 is substantially vertical to the horizontal axis.

Part (A) of FIG. 14 shows an inclination direction of the tablet computer 10 in which the direction of strokes which are input by handwriting may be determined to be "normal direction". The output (x, y, z) of the acceleration sensor is (1, 0, 0).

Part (B) of FIG. 14 shows an inclination direction of the tablet computer 10 in which the direction of strokes which are input by handwriting may be determined to be "180°". The output (x, y, z) of the acceleration sensor is (−1, 0, 0).

Part (C) of FIG. 14 shows an inclination direction of the tablet computer 10 in which the direction of strokes which are input by handwriting may be determined to be "90°". The output (x, y, z) of the acceleration sensor is (0, −1, 0).

Part (D) of FIG. 14 shows an inclination direction of the tablet computer 10 in which the direction of strokes which are input by handwriting may be determined to be "270°". The output (x, y, z) of the acceleration sensor is (0, 1, 0).

In this manner, by using the direction of inclination of the tablet computer 10 which is determined by the output of the acceleration sensor, the top-and-bottom direction of each of strokes, which are input by handwriting, can be determined.

Alternatively, the top-and-bottom direction of each of strokes, which are input by handwriting, may be determined by using the positional relationship between the tablet computer 10 and the user, which is determined in accordance with a result of face recognition using an image captured by the camera module 18, instead of the inclination direction of the tablet computer 10 which is determined by the output of the acceleration sensor.

The positional relationship between the tablet computer 10 and the user can be estimated by determining whether a face image that is recognized is, for example, a face image of the face as viewed in a frontal direction, a face image which is vertically inverted, a face image rotated by 90° to the right, or a face image rotated by 270° to the right.

Alternatively, the top-and-bottom direction of each of strokes, which are input by handwriting, may be determined by selectively using, depending on the condition, the inclination direction of the tablet computer 10 which is determined by the output of the acceleration sensor, or the positional relationship between the tablet computer 10 and the user, which is determined in accordance with a result of face recognition.

In the meantime, when the tablet computer 10 is used in the state in which the tablet compute 10 is placed on the horizontal plane, as shown in FIG. 13, there is substantially no inclination of the tablet computer 10.

Thus, in the method of determining the direction of a stroke (the top-and-bottom direction of a stroke) by using only the output of the acceleration sensor, if the tablet computer 10 is rotated by 180° on the horizontal plane by the user such that the upper end 21 of the tablet computer 10 is directed to the user, and if the user performs a handwriting operation from the upper end 21 side of the tablet computer 10, it is possible that the direction of a stroke (the top-and-bottom direction of a stroke) which is input by the handwriting operation cannot correctly be determined.

In addition, there is a case in which the user uses the tablet computer 10 by placing it on the user's laps. In this case, the attitude of the tablet computer 10 becomes unstable. Thus, in the method of determining the direction of a stroke (the top-and-bottom direction of a stroke) by using only the output of the acceleration sensor, it is possible, for example, that the top-and-bottom direction of a stroke, relative to the screen, is erroneously determined to be "90°", "180°" or "270°", despite the user intending to handwrite the stroke in the "normal direction".

In some cases, such erroneous determination can be prevented by the method of determining the direction of a stroke by using a face recognition result.

Figure 15:
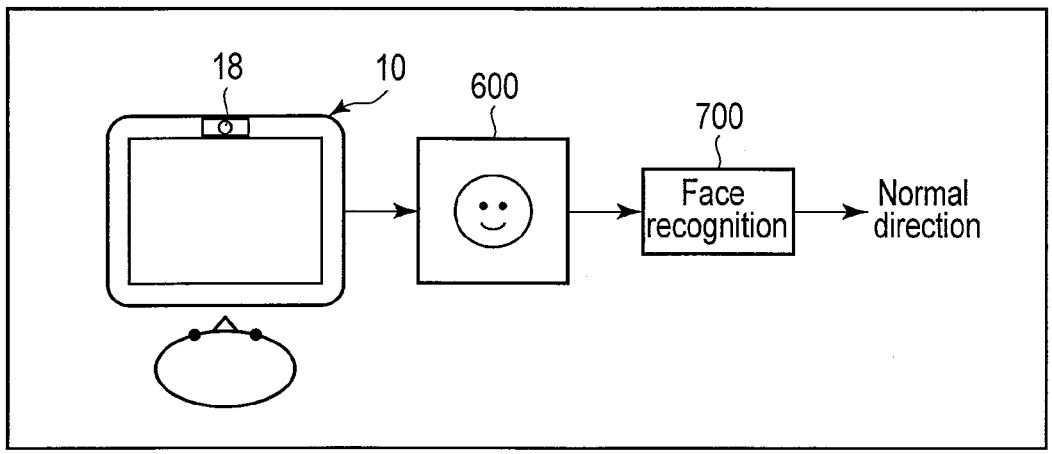
FIG. 15 is a view illustrating an example of an operation of determining stroke direction information with use of a face recognition result.

FIG. 15 illustrates an example of an operation of determining stroke direction information with use of a face recognition result.

In FIG. 15, the case is assumed that the user is using the tablet computer 10 while viewing the screen (note view screen 500) of the tablet computer 10 in the normal direction. The use mode of FIG. 15 corresponds to, for example, the state in which the tablet computer 10 is placed on the horizontal plane and the lower end side of the tablet computer 10 is directed to the user, or the state in which the user holds the tablet computer 10 such that note view screen 500 is set in the normal direction. The digital notebook application program executes a face recognition process 700 for detecting a face image of a person (user) included in an image 600 which is captured by the camera module 18. Based on the result of the face recognition process 700, the digital notebook application program can specify the direction of the face image in the image 600. Accordingly, based on the result of the face recognition process 700, the digital notebook application program can recognize that the lower end side of the tablet computer 10 is directed to the user, that is, the positional relationship between the tablet computer 10 and the user is such a positional relationship that a stroke can be handwritten in the above-described "normal direction".

Figure 16:
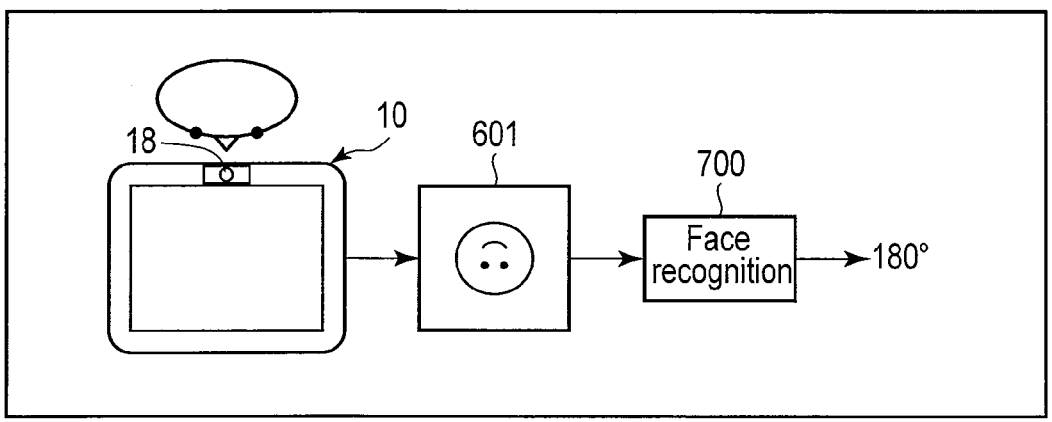
FIG. 16 is a view illustrating another example of the operation of determining stroke direction information with use of a face recognition result.

FIG. 16 illustrates another example of the operation of determining stroke direction information with use of a face recognition result.

In FIG. 16, the case is assumed that the user is using the tablet computer 10 while viewing the screen (note view screen 500) of the tablet computer 10 which is vertically inverted. The use mode of FIG. 16 corresponds to, for example, the state in which the tablet computer 10 is placed on the horizontal plane and the upper end side of the tablet computer 10 is directed to the user, or the state in which the user holds the tablet computer 10 such that note view screen 500 is vertically inverted. The digital notebook application program executes the face recognition process 700 for detecting a face image of a person (user) included in an image 601 which is captured by the camera module 18. Based on the result of the face recognition process 700, the digital notebook application program can specify the direction of the face image in the image 601. Accordingly, based on the result of the face recognition process 700, the digital notebook application program can recognize that the upper end side of the tablet computer 10 is directed to the user, that is, the positional relationship between the tablet computer 10 and the user is such a positional relationship that a stroke can be handwritten in the direction of the above-described "180°".

FIG. 17 illustrates another example of the operation of determining stroke direction information with use of a face recognition result.

In FIG. 17, the case is assumed that the user is using the tablet computer 10 while viewing the screen (note view screen 500) of the tablet computer 10 which is rotated by 90° to the right. The use mode of FIG. 17 corresponds to, for example, the state in which the tablet computer 10 is placed on the horizontal plane and the right end side of the tablet computer 10 is directed to the user, or the state in which the user holds the tablet computer 10 such that note view screen 500 is rotated by 90° to the right. The digital notebook application program executes the face recognition process 700 for detecting a face image of a person (user) included in an image 602 which is captured by the camera module 18. Based on the result of the face recognition process 700, the digital notebook application program can specify the direction of the face image in the image 602. Accordingly, based on the result of the face recognition process 700, the digital notebook application program can recognize that the right end side of the tablet computer 10 is directed to the user, that is, the positional relationship between the tablet computer 10 and the user is such a positional relationship that a stroke can be handwritten in the direction of the above-described "270°".

FIG. 18 illustrates another example of the operation of determining stroke direction information with use of a face recognition result.

In FIG. 18, the case is assumed that the user is using the tablet computer 10 while viewing the screen (note view screen 500) of the tablet computer 10 which is rotated by 90° to the left. The use mode of FIG. 18 corresponds to, for example, the state in which the tablet computer 10 is placed on the horizontal plane and the left end side of the tablet computer 10 is directed to the user, or the state in which the user holds the tablet computer 10 such that note view screen 500 is rotated by 90° to the left. The digital notebook application program executes the face recognition process 700 for detecting a face image of a person (user) included in an image 603 which is captured by the camera module 18. Based on the result of the face recognition process 700, the digital notebook application program can specify the direction of the face image in the image 603. Accordingly, based on the result of the face recognition process 700, the digital notebook application program can recognize that the left end side of the tablet computer 10 is directed to the user, that is, the positional relationship between the tablet computer 10 and the user is such a positional relationship that a stroke can be handwritten in the direction of the above-described "90°".

In the meantime, the top-and-bottom direction of a handwritten character, etc. can be determined based on a direction of writing of a handwritten character. However, in the method of determining the top-and-bottom direction, based on the direction of writing, it is difficult to exactly determine the top-and-bottom direction because of characteristics of this method, and this method cannot be adaptive to both LTR language and RTL language.

In the embodiment, since the top-and-bottom direction of each stroke is determined by using at least either the output of the acceleration sensor or the face recognition result, the top-and-bottom direction can exactly be determined, no matter whether the language of the handwritten character is LTR language or RTL language.

Figure 19:
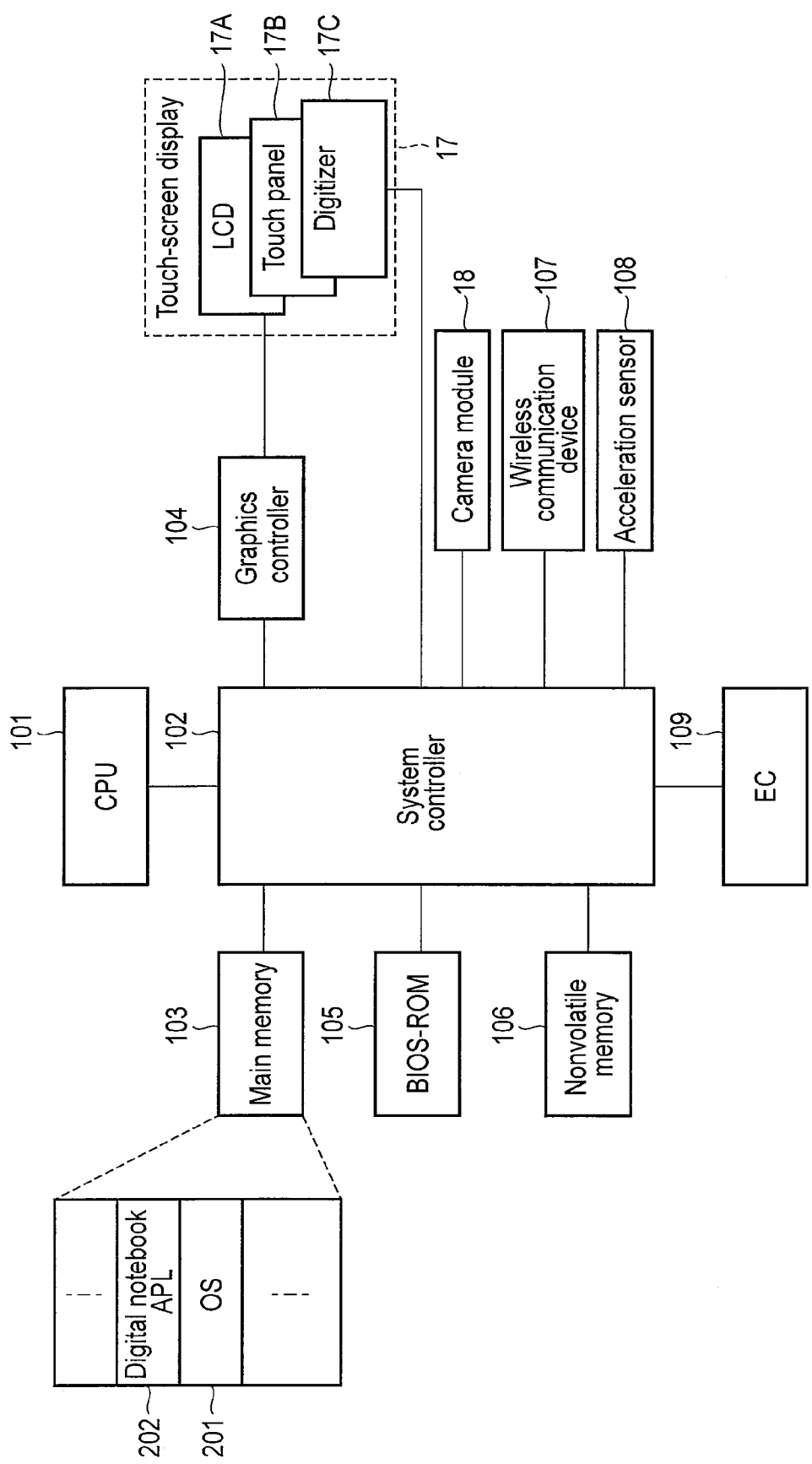
FIG. 19 is an exemplary block diagram illustrating a system configuration of the electronic device of the embodiment.

FIG. 19 shows a system configuration of the tablet computer 10.

As shown in FIG. 19, the tablet computer 10 includes, in addition to the above-described camera module 18, a CPU 101, a system controller 102, a main memory 103, a graphics controller 104, a BIOS-ROM 105, a nonvolatile memory 106, a wireless communication device 107, an acceleration sensor 108, and an embedded controller (EC) 109.

The CPU 101 is a processor which controls the operations of various modules in the tablet computer 10. The CPU 101 executes various kinds of software, which are loaded from the nonvolatile memory 106 that is a storage device into the main memory 103. The software includes an operating system (OS) 201 and various application programs. The application programs include a digital notebook application program 202. The digital notebook application program 202 includes a function of creating and displaying the above-described handwritten data, a function of editing the handwritten data, a handwriting search function, and a recognition function.

In addition, the CPU 101 executes a basic input/output system (BIOS) which is stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a PCI EXPRESS serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B and a digitizer 17C are disposed on the LCD 17A. The touch panel 17B is an electrostatic capacitance-type pointing device for executing an input on the screen of the LCD 17A. A contact position on the screen, which is touched by a finger, and a movement of the contact position are detected by the touch panel 17B. The digitizer 17C is an electromagnetic induction-type pointing device for executing an input on the screen of the LCD 17A. A contact position on the screen, which is touched by the pen 100, and a movement of the contact position are detected by the digitizer 17C.

The wireless communication device 107 is a device configured to execute wireless communication such as wireless LAN or 3G mobile communication. The acceleration sensor 108 is, for example, a three-dimensional acceleration sensor, and is configured to detect a dynamic/static acceleration corresponding to each of the three axial directions. The EC 109 is a one-chip microcomputer including an embedded controller for power management. The EC 109 includes a function of powering on or powering off the tablet computer 10 in accordance with an operation of a power button by the user.

Figure 20:
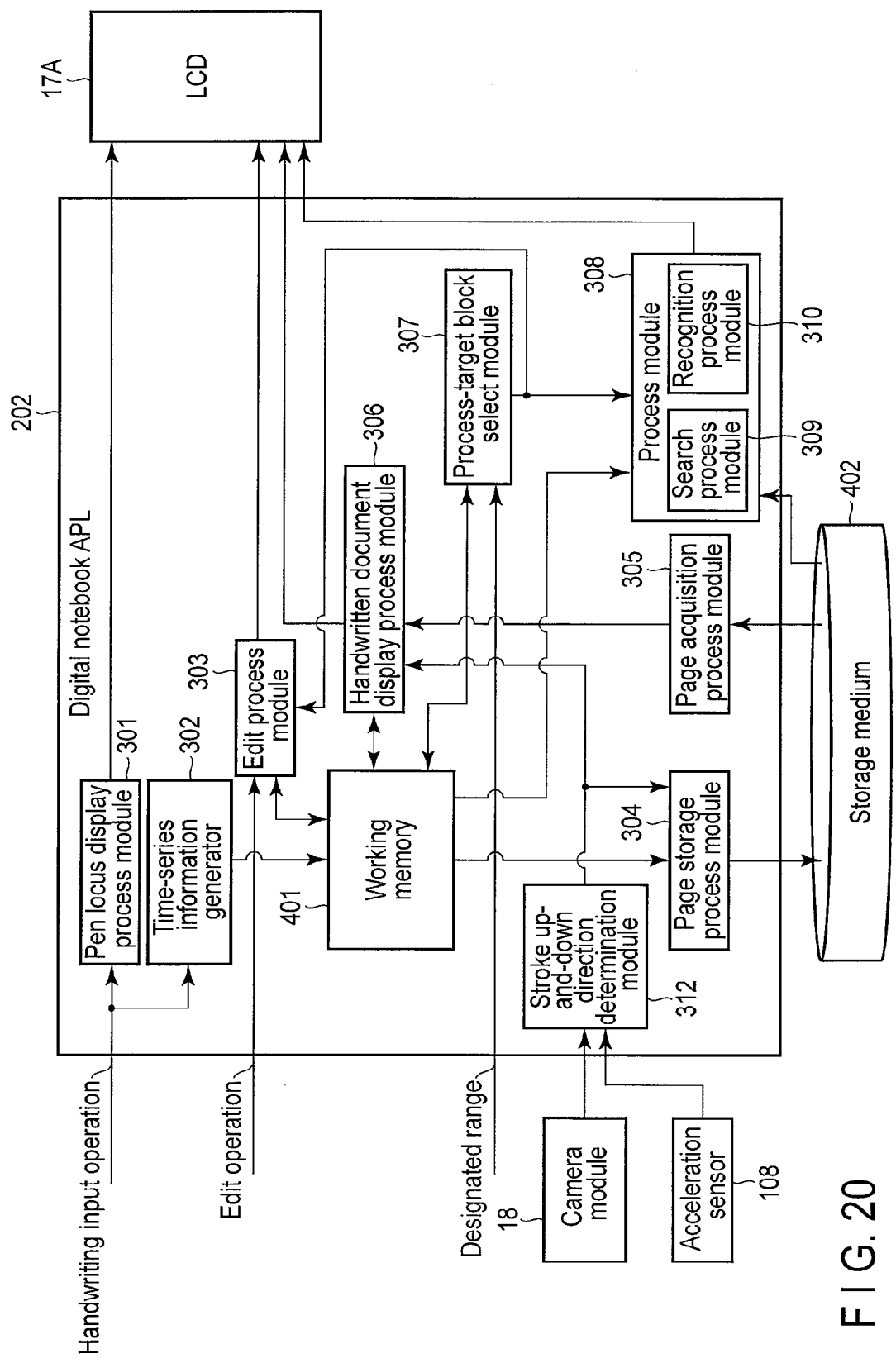
FIG. 20 is an exemplary block diagram illustrating a functional configuration of a digital notebook application program which is executed by the electronic device of the embodiment.

Next, referring to FIG. 20, a description is given of a functional configuration of the digital notebook application program 202.

The digital notebook application program 202 includes a pen locus display process module 301, a time-series information generator 302, an edit process module 303, a page storage process module 304, a page acquisition process module 305, a handwritten document display process module 306, a process-target block select module 307, a process module 308, and a stroke up-and-down direction determination module 312.

The digital notebook application program 202 executes creation, display and edit of a handwritten document (handwritten data) by using stroke data which is input by using the touch-screen display 17. The touch-screen display 17 is configured to detect the occurrence of events such as "touch", "move (slide)" and "release". The "touch" is an event indicating that an external object has come in contact with the screen. The "move (slide)" is an event indicating that the position of contact of the external object has been moved while the external object is in contact with the screen. The "release" is an event indicating that the external object has been released from the screen.

The pen locus display process module 301 and time-series information generator 302 receive an event of "touch" or "move (slide)" which is generated by the touch-screen display 17, thereby detecting a handwriting input operation. The "touch" event includes coordinates of a contact position. The "move (slide)" event also includes coordinates of a contact position at a destination of movement. Thus, the pen locus display process module 301 and time-series information generator 302 can receive coordinate series, which correspond to the locus of movement of the contact position, from the touch-screen display 17.

The pen locus display process module 301 receives coordinate series from the touch-screen display 17 and displays, based on the coordinate series, the loci of plural strokes, which are input by a handwriting input operation with use of the pen 100 or the like, on the screen of the LCD 17A in the touch-screen display 17. By the pen locus display process module 301, the locus of the pen 100 during a time in which the pen 100 is in contact with the screen, that is, the locus of each stroke, is drawn on the screen of the LCD 17A.

The stroke up-and-down direction determination module 312 determines a top-and-bottom direction for each of plural strokes. To be more specific, the stroke up-and-down direction determination module 312 determines a top-and-bottom direction for each of plural strokes which have been input by handwriting, by using at least either (1) the inclination direction of the tablet computer 10 which is determined in accordance with an output of the acceleration sensor 108, or (2) the positional relationship between the tablet computer 10 and the user, which is determined in accordance with a result of face recognition using an image captured by the camera module 18. The top-and-bottom directions of strokes may be the top-and-bottom directions of strokes relative to the screen, as described above.

The time-series information generator 302 receives the above-described coordinate series which are output from the touch-screen display 17, and generates, based on the coordinate series, a plurality of stroke data (time-series information) corresponding to the above-described plural strokes. The stroke data (time-series information), that is, the coordinates corresponding to the respective points of each stroke and the time stamp information of each stroke, may be temporarily stored in a working memory 401.

The page storage process module 304 adds the above-described stroke direction information to each stroke data, based on the up-and-down direction of each stroke which is determined by the stroke up-and-down direction determination module 312. Then, the page storage process module 304 stores in a storage medium 402 handwritten data (handwritten page), the handwritten data including plural stroke data (time-series information) corresponding to plural strokes and the plural pieces of stroke direction information indicative of the top-and-bottom directions of the plural strokes relative to the screen. The storage medium 402, as described above, may be the storage device in the tablet computer 10, the storage device in the personal computer 1, or the storage device in the server 2.

The page acquisition process module 305 reads out from the storage medium 402 arbitrary handwritten data which is already stored in the storage medium 402. The read-out handwritten data is sent to the handwritten document display process module 306. The handwritten document display process module 306 analyzes the handwritten data and displays, based on the analysis result, the loci of strokes indicated by the handwritten data on the screen as a handwritten page.

The edit process module 303 executes a process for editing a handwritten page which is currently being displayed. Specifically, in accordance with an edit operation which is executed by the user on the touch-screen display 17, the edit process module 303 executes an edit process for deleting or moving one or more strokes of a plurality of stokes which are being displayed. Further, the edit process module 303 updates the time-series information which is being displayed, in order to reflect the result of the edit process on the time-series information.

The user can delete an arbitrary stroke of the plural strokes which are being displayed, by using an "eraser" tool, etc. In addition, the user can designate a range of an arbitrary part in the handwritten page which is being displayed, by using a "range designation" tool for surrounding an arbitrary part on the screen by a circle or a rectangle. In accordance with the designated range on the screen, which is designated by this range designation operation, a handwritten data part that is the target of processing, that is, a set of strokes that are the target of processing, is selected by the process-target block select module 307.

When a menu such as "delete" or "move" has been selected from the edit menu by the user, the edit process module 303 executes a process of delete or move on the set of stroke data which has been selected by the process-target block select module 307.

The process module 308 can execute various processes, for example, a handwriting search process and a recognition process, on the process-target handwritten data. The process module 308 includes a search process module 309 and a recognition process module 310.

The search process module 309 executes a handwriting search (stroke search). This handwriting search is a process of searching for a handwritten page including at least one stroke similar to at least one stroke (query stroke), which is a search key, from the storage medium 402. In addition, in this handwriting search, it is possible to search for at least one stroke similar to at least one query stroke from a search-target handwritten page.

In the handwriting search, a stroke similar to a query stroke is searched from plural strokes by matching between the query stroke and these plural strokes in the search-target handwritten page. The stroke similar to the query stroke is a stroke having a handwriting characteristic similar to the handwriting characteristic of the query stroke. The handwriting characteristic is, for example, the shape of the stroke, the direction of writing of the stroke, etc.

Various methods are usable as the method of calculating the degree of similarity between strokes. For example, coordinate series of each stroke may be treated as a vector. In this case, in order to calculate the degree of similarity between vectors which are targets of comparison, an inner product between the vectors which are targets of comparison may be calculated. In many cases, a search key includes a plurality of strokes. In such cases, a handwritten page including a stroke series similar to plural strokes (query stroke series), which is a search key, is searched from the storage medium 402. In the search for the query stroke series, DP (Dynamic Programming) matching may be used.

The recognition process module 310 executes a recognition process, such as character recognition, on a handwritten page that is being displayed. The case is now assumed that the entirety of a certain handwritten page or a part in this handwritten page is subject to character recognition. It is possible that the entirety of the handwritten page or a process-target part in this handwritten page includes, for example, a plurality of strokes having the above-described direction of "180°". In this case, the recognition process module 310 extracts the plural strokes having the direction of "180°" from the handwritten page or the process-target part in this handwritten page, and converts, by coordinate conversion, these plural strokes to other plural strokes having a direction corresponding to the "normal direction". Then, the recognition process module 310 executes character recognition of these other plural strokes, and outputs at least one character code corresponding to these other plural strokes. Thereby, even if the entirety of a handwritten page or a process-target part in this handwritten page includes strokes having the direction of "180°", character recognition can correctly be executed on these strokes.

Figure 21:
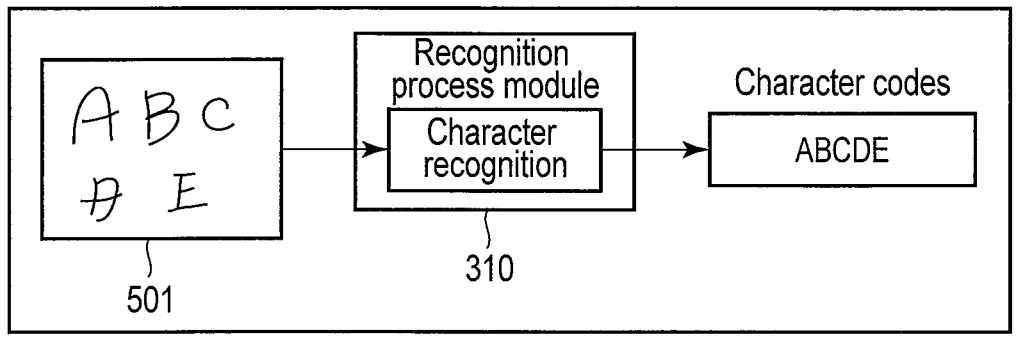
FIG. 21 is an exemplary block diagram for explaining a character recognition operation on strokes having a direction corresponding to a normal direction, the character recognition operation being executed by the electronic device of the embodiment.

FIG. 21 illustrates a character recognition process operation on strokes 501 corresponding to a character string "ABCDE" having a direction of "normal direction". Based on the above-described stroke direction information, the recognition process module 310 determines whether the strokes 501 are strokes having the direction of "normal direction". Since the strokes 501 are strokes having the direction of "normal direction", the recognition process module 310 does not execute the above-described coordinate conversion. Then, using a character recognition module in the recognition process module 310, the recognition process module 310 executes character recognition for converting the strokes 501 to at least one character code (in this example, a plurality of character codes corresponding to the character string "ABCDE").

Figure 22:
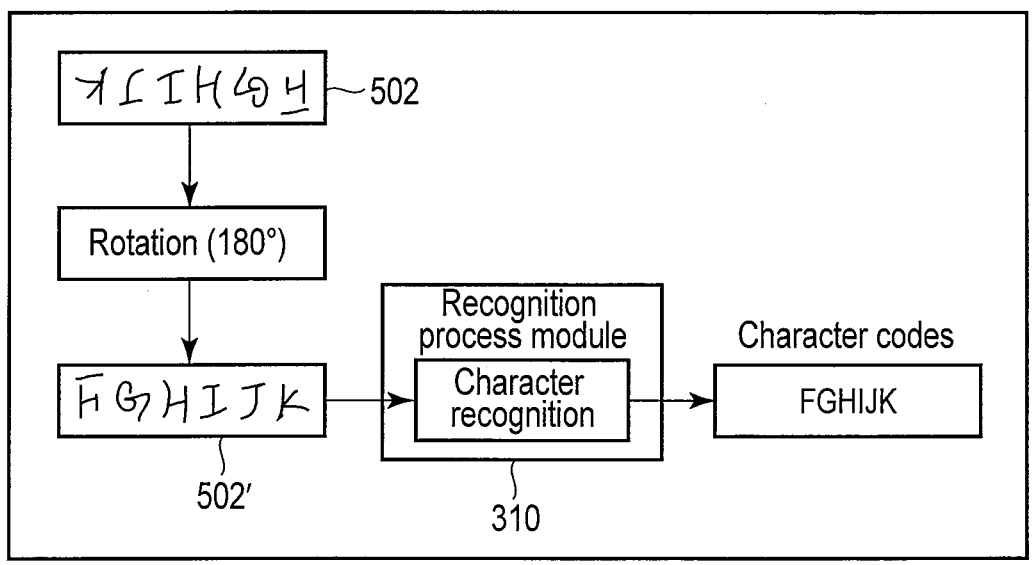
FIG. 22 is an exemplary block diagram for explaining a character recognition operation on strokes having a direction opposite to the normal direction, the character recognition operation being executed by the electronic device of the embodiment.

FIG. 22 illustrates a character recognition process operation on strokes 502 corresponding to a character string "FGHIJK" having the direction of "180°". Based on the above-described stroke direction information, the recognition process module 310 determines whether the strokes 502 are strokes having the direction of "normal direction". The strokes 502 are not strokes having the direction of "normal direction", but are strokes having the direction of "180°". Thus, the recognition process module 310 executes the above-described coordinate conversion (180° rotation/inversion), and converts the strokes 502 to strokes 502' having the direction of "normal direction". Then, using the character recognition module in the recognition process module 310, the recognition process module 310 executes character recognition for converting the strokes 502' to at least one character code (in this example, a plurality of character codes corresponding to the character string "FGHIJK").

In the meantime, also in the case of character-recognizing strokes having the direction of "90°", coordinate conversion is executed for converting the strokes having the direction of "90°" to strokes having the direction of "normal direction". Similarly, in the case of character-recognizing strokes having the direction of "270°", coordinate conversion is executed for converting the strokes having the direction of "270°" to strokes having the direction of "normal direction".

Figure 23:
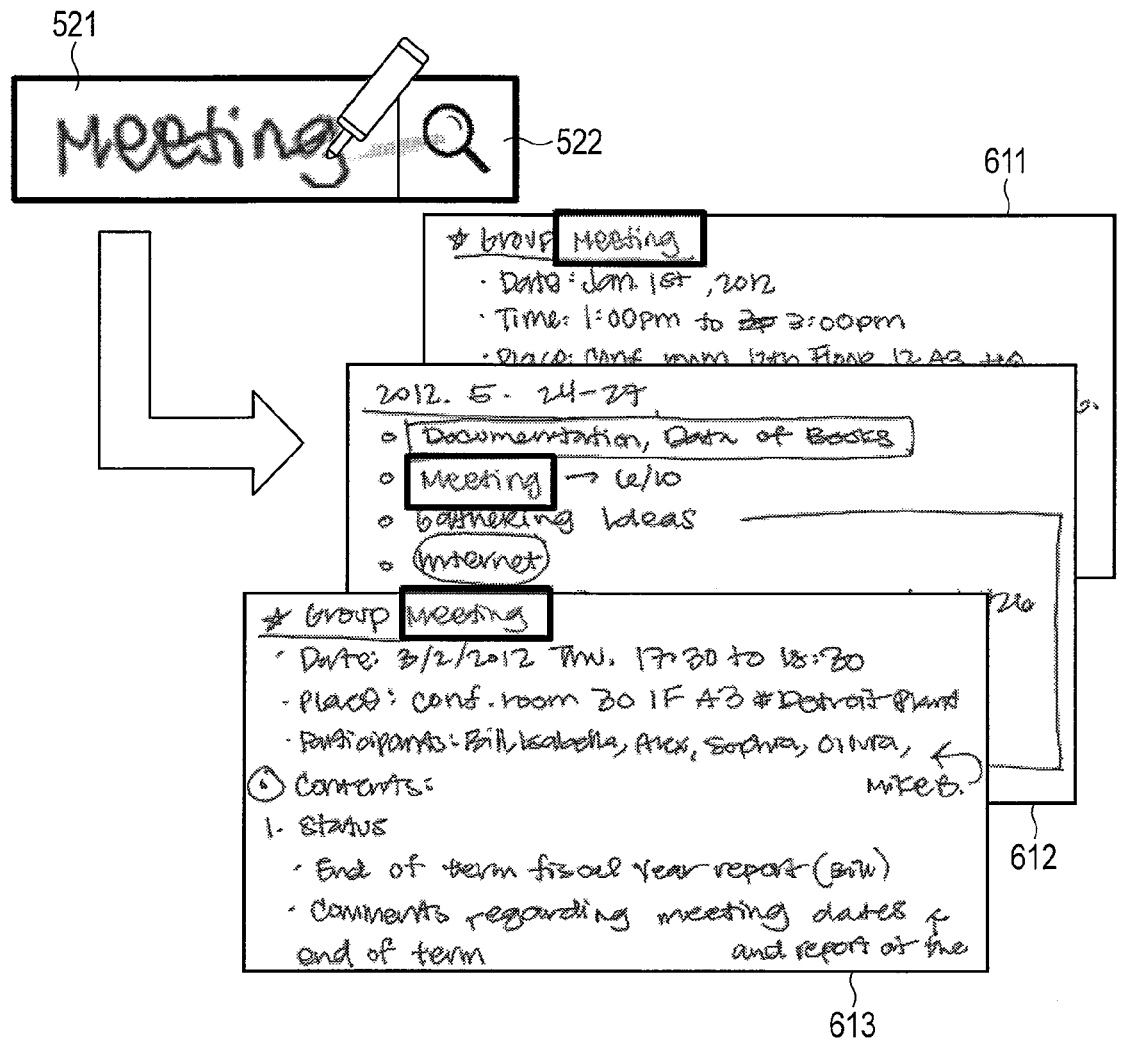
FIG. 23 is an exemplary view for explaining the outline of a handwriting search which is executed by the electronic device of the embodiment.

FIG. 23 illustrates the outline of a handwriting search.

The search process module 309 displays on the screen a search key input dialog including a search key input area 521 and a search button 522. The search key input area 521 is an input area for handwriting a character string, a graphic, a table, etc., which is to be set as a search key. The search button 522 is a button for requesting execution of a search process. FIG. 23 illustrates the case in which a handwritten character string "Meeting" has been input as a search key in the search key input area 521. The user can handwrite a handwritten graphic, a handwritten table, etc., as well as the handwritten character string, in the search key input area 521.

If it is detected that the search button 522 has been tapped, the search process module 309 determines the strokes, which correspond to the handwritten character string "Meeting", to be a query stroke series, and searches for a handwritten page including a stroke series similar to this query stroke series. The case is now assumed that handwritten pages 611, 612 and 613 include strokes corresponding to the handwritten character string "Meeting". In this case, the search process module 309 displays thumbnails of the handwritten pages 611, 612 and 613 on the screen. Further, the search process module 309 may display, with emphasis, hit words (handwritten character string "Meeting") in the handwritten pages 611, 612 and 613.

It is possible that a search-target handwritten page includes a plurality of strokes having the above-described direction of "180°". In this case, the search process module 309 extracts the strokes having the direction of "180°" from the handwritten page, and converts, by coordinate conversion, these strokes to other plural strokes having the direction corresponding to "normal direction". Then, by matching between the query strokes and these other plural strokes, the search process module 309 searches for strokes similar to the query strokes from these other plural strokes. Thereby, even if a plurality of strokes having the direction of "180°" are included in a handwritten page, a handwriting search for these strokes can correctly be executed.

Figure 24:
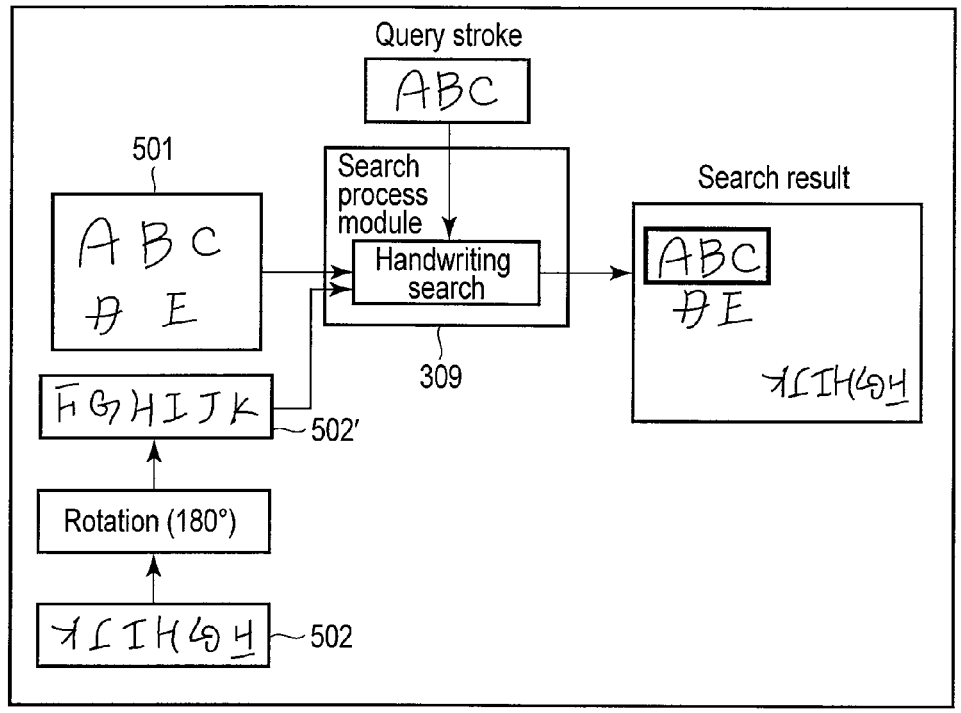
FIG. 24 is an exemplary view for explaining a handwriting search operation for strokes having a direction corresponding to the normal direction, the handwriting search operation being executed by the electronic device of the embodiment.

FIG. 24 illustrates an example of the handwriting search. The case is now assumed that a handwritten page including strokes 501 and 502, which have been described with reference to FIG. 5, is a search target. It is assumed that the query stroke series is a handwritten character string "ABC".

Based on the above-described stroke direction information, the search process module 309 determines whether the strokes 501 are strokes having the direction of "normal direction". Since the strokes 501 are strokes having the direction of "normal direction", the search process module 309 does not execute the above-described coordinate conversion. In addition, based on the above-described stroke direction information, the search process module 309 determines whether the strokes 502 are strokes having the direction of "normal direction". Since the strokes 502 are strokes having the direction of "180°", the search process module 309 executes the above-described coordinate conversion (180° rotation/inversion), and converts the strokes 502 to strokes 502' having the direction of "normal direction". Then, the search process module 309 searches for strokes similar to the query strokes from the strokes 501 and strokes 502'.

In FIG. 24, the handwritten character string "ABC" in the strokes 501 is searched as the stroke series similar to the query stroke series, and this handwritten character string "ABC" is displayed with emphasis.

Figure 25:
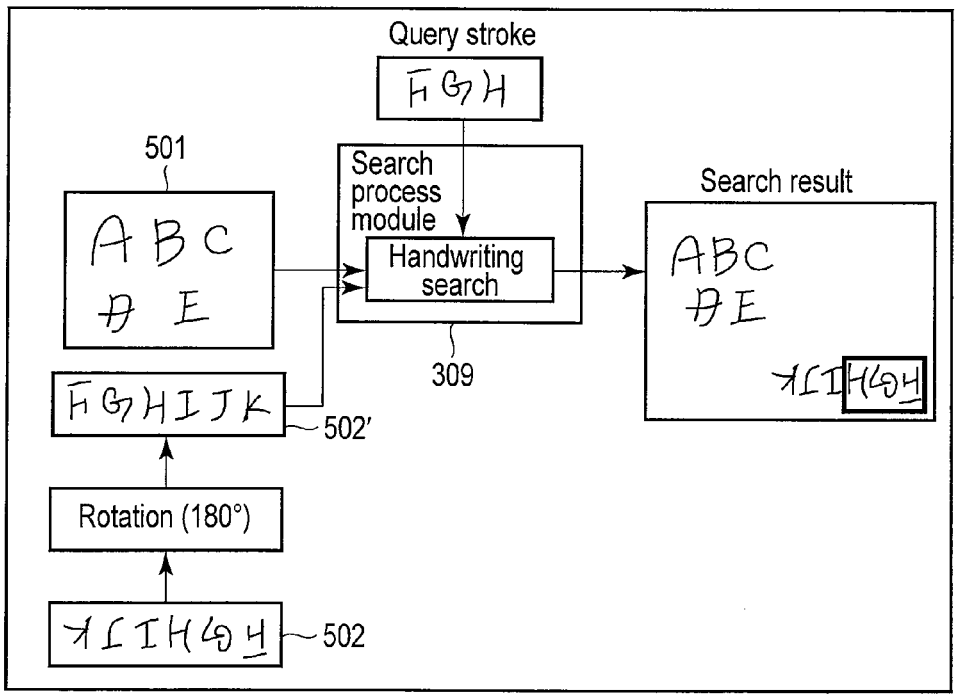
FIG. 25 is an exemplary view for explaining a handwriting search operation for strokes having a direction opposite to the normal direction, the handwriting search operation being executed by the electronic device of the embodiment.

FIG. 25 illustrates a handwriting search operation which is executed when a handwritten character string "FGH", instead of the handwritten character string "ABC", has been input as the query stroke series. In FIG. 25, by matching between the strokes 502' and the query stroke series, the handwritten character string "FGH" in the strokes 502' is searched as the stroke series similar to the query stroke series. Then, the handwritten character string "FGH" in the strokes 502 is displayed with emphasis.

In the meantime, also when strokes having the direction of "90°" are included in a search-target page, coordinate conversion is executed for converting the strokes having the direction of "90°" to strokes having the direction of "normal direction". Similarly, when strokes having the direction of "270°" are included in a search-target page, coordinate conversion is executed for converting the strokes having the direction of "270°" to strokes having the direction of "normal direction".

Figure 26:
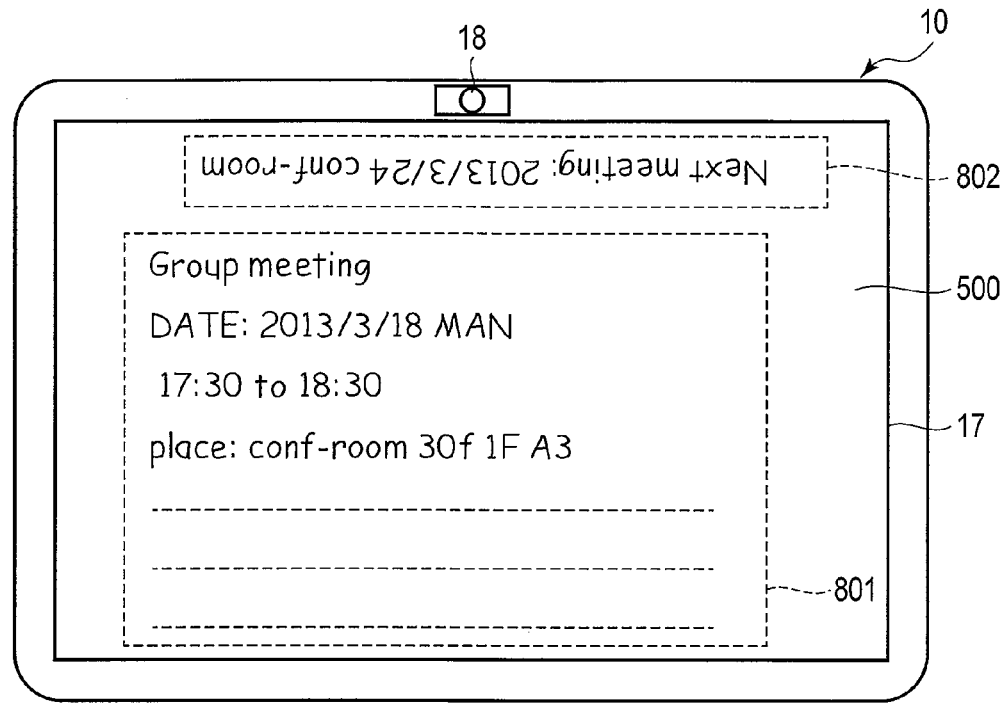
FIG. 26 is a view for describing an example of a handwritten document including both strokes having a direction corresponding to the normal direction and strokes having a direction opposite to the normal direction, the handwritten document being displayed by the electronic device of the embodiment.

FIG. 26 illustrates an example of a handwritten page including both strokes having the direction of "normal direction" and strokes having the direction opposite to "normal direction". This handwritten page includes strokes 801 having the direction of "normal direction" and strokes 802 having the direction of "180°". The handwritten document display process module 306 can selectively display either of the strokes 801 and 802, which have different directions, on the note view screen 500.

For example, the handwritten document display process module 306 can extract only stroke data corresponding to the strokes 801 having the direction of "normal direction" from the handwritten page, and can display only the strokes 801 having the direction of "normal direction" on the note view screen 500. Alternatively, the handwritten document display process module 306 can display either the strokes 801 having the direction of "normal direction" or the strokes 802 having the direction of "180°" on the note view screen 500 with emphasis.

Besides, the handwritten document display process module 306 can selectively display either the strokes 801 or the strokes 802 on the note view screen 500, in accordance with the present inclination direction of the tablet computer 10.

Figure 27:
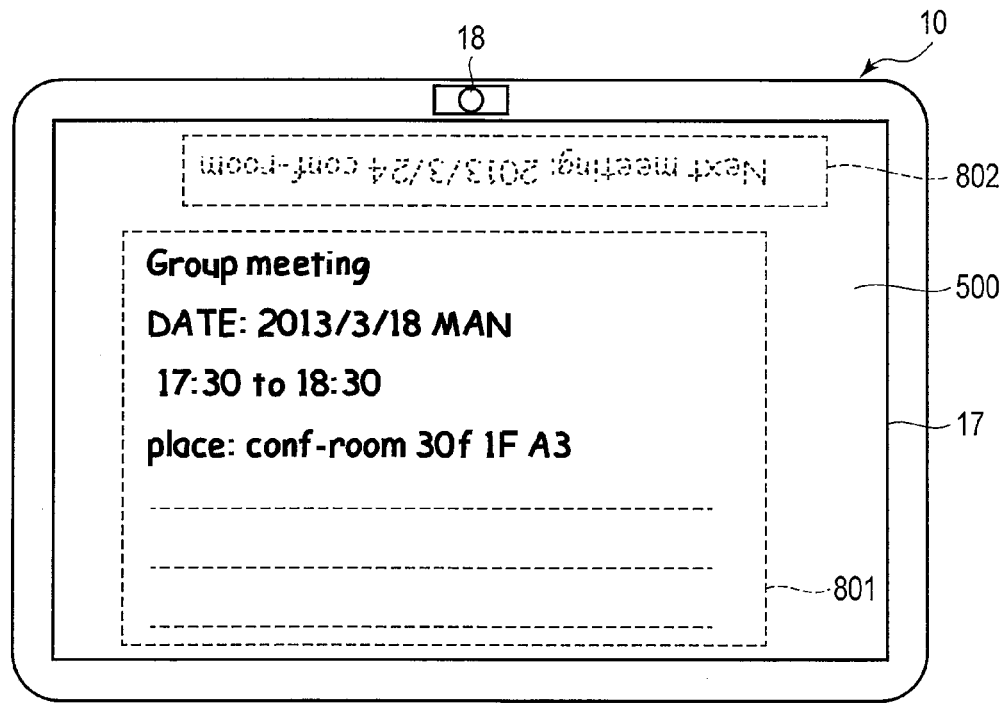
FIG. 27 is a view for describing an example of an operation of selectively displaying either strokes having a direction corresponding to the normal direction or strokes having a direction opposite to the normal direction, in accordance with the present inclination direction of the electronic device of the embodiment.

FIG. 27 illustrates an example of the operation of selectively displaying either strokes having a direction corresponding to the normal direction or strokes having a direction opposite to the normal direction, in accordance with the present inclination direction of the tablet computer 10. The case is now assumed that the present inclination direction of the tablet computer 10 is such an inclination direction that the direction of the note view screen 500 agrees with the direction of gravity. In this case, the loci of the strokes 801, which are observed by the user, are in the normal state in which these loci are not vertically inverted. However, the loci of the strokes 802, which are observed by the user, are in the vertically inverted state. Accordingly, in this case, the handwritten document display process module 306 may display only the strokes 801 having the direction agreeing with the direction of the note view screen 500. Alternatively, the handwritten document display process module 306 may display with emphasis the strokes 801 having the direction agreeing with the direction of the note view screen 500, and may display the strokes 802 in a thin color.

Furthermore, the handwritten document display process module 306 can also vertically invert the strokes 802, and can display the vertically inverted strokes 802 on the note view screen 500. Thereby, the strokes 801 and the strokes 802 can be display on the note view screen 500 in the direction agreeing with the direction of the note view screen 500.

Figure 28:
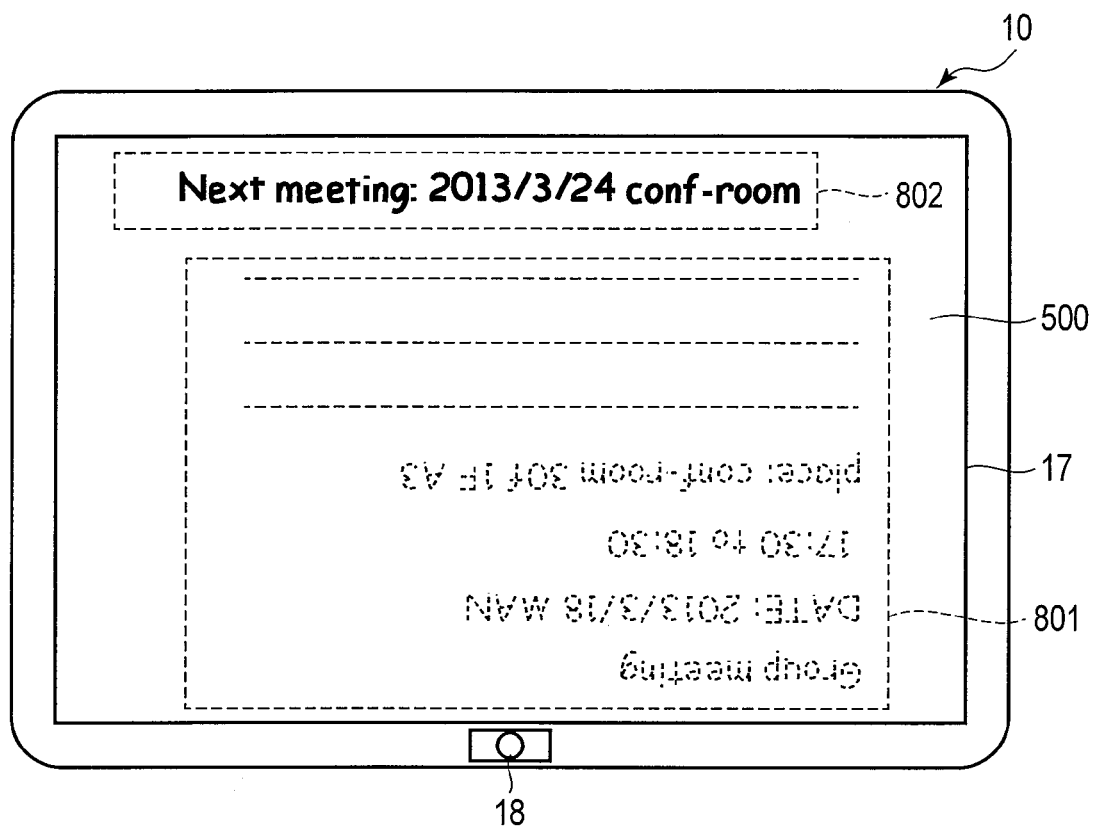
FIG. 28 is a view for describing another example of the operation of selectively displaying either strokes having a direction corresponding to the normal direction or strokes having a direction opposite to the normal direction, in accordance with the present inclination direction of the electronic device of the embodiment.

As shown in FIG. 28, if the present inclination direction of the tablet computer 10 is such a direction that the direction of the note view screen 500 is opposite to the direction of gravity, the handwritten document display process module 306 may display only the strokes 802. Alternatively, the handwritten document display process module 306 may display with emphasis the strokes 802, and may display the strokes 801 in a thin color.

Figure 29:
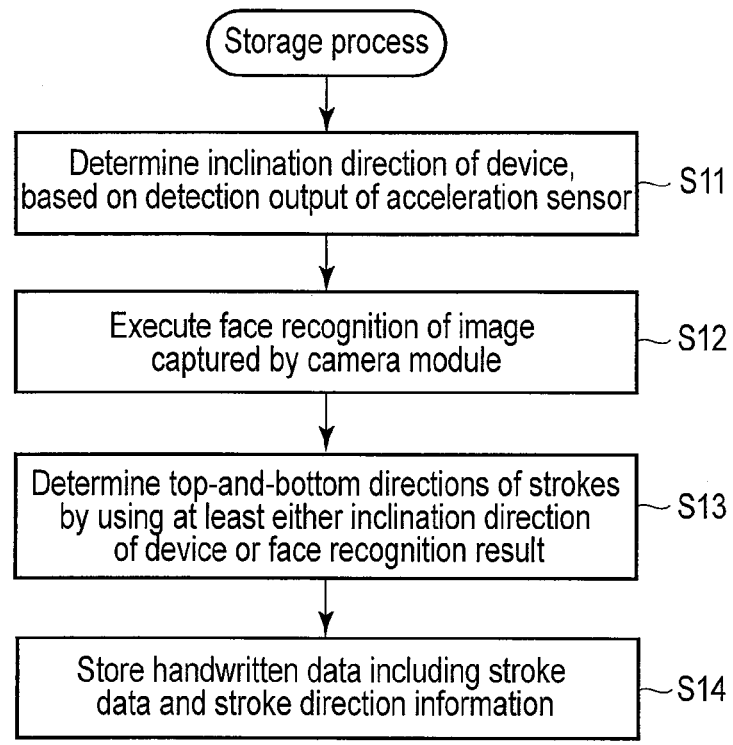
FIG. 29 is an exemplary flowchart illustrating the procedure of a handwritten data storage process which is executed by the electronic device of the embodiment.

A flowchart of FIG. 29 illustrates the procedure of a handwritten data storage process.

To start with, the stroke up-and-down direction determination module 312 determines the inclination direction of the tablet computer 10, based on the detection output of the acceleration sensor 108 (step S11). Next, the stroke up-and-down direction determination module 312 executes face recognition for detecting a face image of a person (user) included in an image which is captured by the camera module 18, and estimates, based on the result of the face recognition, the present positional relationship between the tablet computer 10 and the user (step S12). Then, the stroke up-and-down direction determination module 312 determines the top-and-bottom directions of strokes which have been input by handwriting, by using at least either the present inclination direction of the tablet computer 10, or the present positional relationship between the tablet computer 10 and the user (step S13).

In step S13, the stroke up-and-down direction determination module 312 may determine, for example, whether the present inclination of the tablet computer is less than a reference value. When the tablet computer 10 is used in a state in which the back surface thereof is substantially horizontal to the horizontal plane, the present inclination of the tablet computer is less than the reference value. In this case, the stroke up-and-down direction determination module 312 determines the top-and-bottom directions of strokes which have been input by handwriting, by using the present positional relationship between the tablet computer 10 and the user, in preference to the present inclination direction of the tablet computer 10 which is determined by the output of the acceleration sensor 108. For example, if the present positional relationship between the tablet computer 10 and the user has successfully been determined by the above-described face recognition, the top-and-bottom directions of strokes relative to the screen may be determined based on only the present positional relationship. Thereby, the top-and-bottom directions can be determined more exactly than in the case of using the present inclination direction of the tablet computer 10 which is determined by the output of the acceleration sensor 108.

On the other hand, when the present inclination of the tablet computer is the reference value or more, the stroke up-and-down direction determination module 312 may determine the top-and-bottom directions of strokes which have been input by handwriting, by using the present inclination direction of the tablet computer 10, in preference to the present positional relationship between the tablet computer 10 and the user. In this case, the stroke up-and-down direction determination module 312 may determine the top-and-bottom directions of strokes relative to the screen, based on only the present inclination direction of the tablet computer 10. Thereby, the top-and-bottom directions of strokes can be determined more quickly with a lighter load than in the case of using the face recognition result.

The page storage process module 304 stores in the storage medium the handwritten data, the handwritten data including stroke data corresponding to strokes which are input by handwriting, and stroke direction information indicative of the top-and-bottom directions of the strokes which are input by handwriting (step S14).

In the meantime, as described above, the top-and-down directions of the strokes which are input by handwriting may be determined by using only the present inclination direction of the tablet computer 10, or only the present positional relationship between the tablet computer 10 and the user.

Figure 30:
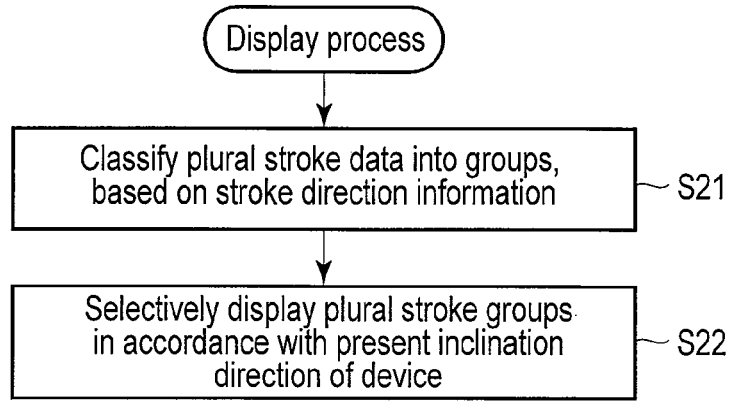
FIG. 30 is an exemplary flowchart illustrating the procedure of a handwritten data display process which is executed by the electronic device of the embodiment.

FIG. 30 illustrates the procedure of a process of displaying a plurality of strokes, based on handwritten data.

The handwritten document display process module 306 reads out handwritten data, which is a display process target, from the storage medium. Then, based on the stroke direction information that is added to each stroke data in the handwritten data, the handwritten document display process module 306 classifies plural stroke data in the handwritten data into a plurality of groups (step S21). In step S21, the plural strokes are classified into four groups, namely a group of strokes having a direction of "normal direction", a group of strokes having a direction of "90°", a group of strokes having a direction of "180°", and a group of strokes having a direction of "270°". Then, the handwritten document display process module 306 selectively displays the plural groups on the screen (step S22). In step S22, for example, the handwritten document display process module 306 may select, from the four groups, a group having the top-and-bottom direction agreeing with the present inclination direction of the tablet computer 10, and may draw the strokes belonging to the selected group on the screen.

As has been described above, in the embodiment, the handwritten data, which includes a plurality of stroke data corresponding to a plurality of strokes and a plurality of pieces of direction information relating to the top-and-bottom directions of the plurality of strokes, is stored in the storage medium. Therefore, the individual stroke data can be processed in the state in which their top-and-bottom directions are taken into account. In addition, the top-and-bottom directions of the plural strokes are determined by using at least either the inclination direction of the tablet computer 10 which is determined in accordance with the output of the acceleration sensor 108, or the positional relationship between the tablet computer 10 and the user, which is determined in accordance with the result of face recognition using an image captured by the camera module 18. Therefore, the top-and-bottom directions can be determined more exactly than in the case of determining the top-and-bottom directions by using the direction of writing of strokes.

Since the various processes on handwritten documents in the embodiment can be realized by a computer program, the same advantageous effects as with the present embodiment can easily be obtained simply by installing the computer program into an ordinary computer with a touch-screen display through a computer-readable storage medium which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display processor configured to display on a screen a plurality of strokes input by handwriting;
a hardware processor configured to determine a top-and-bottom direction for each of the plurality of strokes; and
a storage processor configured to store in a storage medium handwritten data, the handwritten data comprising a plurality of stroke data corresponding to the plurality of strokes, and a plurality of pieces of direction information relating to a top-and-bottom direction of each of the plurality of strokes,
wherein the hardware processor is configured to determine a top-and-bottom direction of each of the plurality of strokes, by using at least either a direction of inclination of the device which is determined in accordance with an output of an acceleration sensor in the device, or a positional relationship between the device and a user which is determined in accordance with a result of face recognition using an image captured by a camera module of the device;
wherein the display processor is configured to select stroke data having a top-and-bottom direction agreeing with a present direction of inclination of the device, from between at least one first stroke data having a top-and-bottom direction which is a first direction, and at least one second stroke data having a top-and-bottom direction which is a second direction that is different from the first direction, and to display at least one stroke corresponding to the selected stroke data on the screen.

2. The electronic device of claim 1, wherein the positional relationship between the device and the user, which is determined in accordance with the result of the face recognition, is configured to determine a top-and-bottom direction of each of the plurality of strokes, when the inclination of the device is less than a first inclination.

3. The electronic device of claim 1, wherein the direction of inclination of the device is configured to determine a top-and-bottom direction of each of the plurality of strokes, when the inclination of the device is the first inclination or more.

4. The electronic device of claim 1, wherein each of the plurality of pieces of direction information is indicative of either a first direction which agrees with a top-and-bottom direction of the screen, or a second direction opposite to the first direction.

5. The electronic device of claim 1, wherein each of the plurality of pieces of direction information is indicative of any one of a first direction which agrees with a top-and-bottom direction of the screen, a second direction opposite to the first direction, a third direction which is rotated by 90° relative to the top-and-bottom direction of the screen, and a fourth direction which is rotated by 270° relative to the top-and-bottom direction of the screen.

6. The electronic device of claim 1, wherein the display processor is configured to selectively display on the screen at least one stroke corresponding to at least one first stroke data having a top-and-bottom direction which is a first direction, and at least one stroke corresponding to at least one second stroke data having a top-and-bottom direction which is a second direction that is different from the first direction.

7. The electronic device of claim 1, further comprising a converter configured to convert, by coordinate conversion, a plurality of first strokes having a top-and-bottom direction which is a second direction that is different from a first direction agreeing with a direction of the screen, to a plurality of second strokes having a top-and-bottom direction which is the first direction, and to output a character code corresponding to the plurality of second strokes.

8. The electronic device of claim 1, further comprising a search processor configured to convert, by coordinate conversion, a plurality of first strokes having a top-and-bottom direction which is a second direction that is different from a first direction agreeing with a direction of the screen, to a plurality of second strokes having a top-and-bottom direction which is the first direction, and to search for a stroke similar to a third stroke which is a search key from the plurality of first strokes, by matching between the third stroke which is the search key and the plurality of second strokes.

9. A method of processing handwritten data, comprising:
displaying on a screen of an electronic device a plurality of strokes input by handwriting, the electronic device comprising a display processor;
determining, by a hardware processor, a top-and-bottom direction for each of the plurality of strokes; and
storing in a storage medium handwritten data, the handwritten data comprising a plurality of stroke data corresponding to the plurality of strokes, and a plurality of pieces of direction information relating to a top-and-bottom direction of each of the plurality of strokes,
wherein the determining includes determining a top-and-bottom direction of each of the plurality of strokes, by using at least either a direction of inclination of the device which is determined in accordance with an output of an acceleration sensor in the device, or a positional relationship between the device and a user which is determined in accordance with a result of face recognition using an image captured by a camera module of the device;
wherein the display processor is configured to select stroke data having a top-and-bottom direction agreeing with a present direction of inclination of the device, from between at least one first stroke data having a top-and-bottom direction which is a first direction, and at least one second stroke data having a top-and-bottom direction which is a second direction that is different from the first direction, and to display at least one stroke corresponding to the selected stroke data on the screen.

10. The method of claim 9, wherein the positional relationship between the device and the user, which is determined in accordance with the result of the face recognition, is configured to determine a top-and-bottom direction of each of the plurality of strokes, when the inclination of the device is less than a first inclination.

11. The method of claim 9, wherein the direction of inclination of the device is configured to determine a top-and-bottom direction of each of the plurality of strokes, when the inclination of the device is the first inclination or more.

12. The method of claim 9, further comprising:
converting, by coordinate conversion, a plurality of first strokes having a top-and-bottom direction which is a second direction that is different from a first direction agreeing with a direction of the screen, to a plurality of second strokes having a top-and-bottom direction which is the first direction; and
outputting a character code corresponding to the plurality of second strokes.

13. The method of claim 9, further comprising:
converting, by coordinate conversion, a plurality of first strokes having a top-and-bottom direction which is a second direction that is different from a first direction agreeing with a direction of the screen, to a plurality of second strokes having a top-and-bottom direction which is the first direction; and
searching for a stroke similar to a third stroke which is a search key from the plurality of first strokes, by matching between the third stroke which is the search key and the plurality of second strokes.

14. A computer-readable, non-transitory storage medium having stored thereon a computer program which is executable by a computer, the computer comprising a display processor, and the computer program controlling the computer to execute functions of:
displaying on a screen of the computer a plurality of strokes input by handwriting,
determining a top-and-bottom direction for each of the plurality of strokes; and
storing in a storage medium handwritten data, the handwritten data comprising a plurality of stroke data corresponding to the plurality of strokes, and a plurality of pieces of direction information relating to a top-and-bottom direction of each of the plurality of strokes,
wherein the determining determines a top-and-bottom direction of each of the plurality of strokes, by using at least either a direction of inclination of the computer which is determined in accordance with an output of an acceleration sensor in the computer, or a positional relationship between the computer and a user which is determined in accordance with a result of face recognition using an image captured by a camera module of the computer;
wherein the display processor is configured to select stroke data having a top-and-bottom direction agreeing with a present direction of inclination of the device, from between at least one first stroke data having a top-and-bottom direction which is a first direction, and at least one second stroke data having a top-and-bottom direction which is a second direction that is different from the first direction, and to display at least one stroke corresponding to the selected stroke data on the screen.

15. The storage medium of claim 14, wherein the positional relationship between the computer and the user, which is determined in accordance with the result of the face recognition, is configured to determine a top-and-bottom direction of each of the plurality of strokes, when the inclination of the computer is less than a first inclination.

16. The storage medium of claim 14, wherein the direction of inclination of the computer is configured to determine a top-and-bottom direction of each of the plurality of strokes, when the inclination of the computer is the first inclination or more.

17. The storage medium of claim 14, wherein the computer program further controls the computer to execute functions of:

converting, by coordinate conversion, a plurality of first strokes having a top-and-bottom direction which is a second direction that is different from a first direction agreeing with a direction of the screen, to a plurality of second strokes having a top-and-bottom direction which is the first direction; and outputting a character code corresponding to the plurality of second strokes.

18. The storage medium of claim 14, wherein the computer program further controls the computer to execute functions of:

converting, by coordinate conversion, a plurality of first strokes having a top-and-bottom direction which is a second direction that is different from a first direction agreeing with a direction of the screen, to a plurality of second strokes having a top-and-bottom direction which is the first direction; and searching for a stroke similar to a third stroke which is a search key from the plurality of first strokes, by matching between the third stroke which is the search key and the plurality of second strokes.

* * * * *